United States Patent [19]

Tafoya et al.

[11] Patent Number: 5,917,480
[45] Date of Patent: Jun. 29, 1999

[54] METHOD AND SYSTEM FOR INTERACTING WITH THE CONTENT OF A SLIDE PRESENTATION

[75] Inventors: John Edward Tafoya, Santa Clara; Rosanna Ho, Foster City; Susan Grabau, Sunnyvale, all of Calif.

[73] Assignee: Microsoft Corporation, Redmond, Wash.

[21] Appl. No.: 08/658,220

[22] Filed: Jun. 4, 1996

[51] Int. Cl.[6] ...................................................... G06T 1/00
[52] U.S. Cl. ............................................................. 345/302
[58] Field of Search ................................... 345/302, 346, 345/418, 326, 333, 342, 347

[56] References Cited

U.S. PATENT DOCUMENTS 5,363,482  11/1994  Victor et al. ............................. 345/302
5,455,910  10/1995  Johnson et al. ......................... 345/302
5,473,744  12/1995  Allen et al. .............................. 345/302

*Primary Examiner*—Joseph H. Feild
*Assistant Examiner*—Alford W. Kindred
*Attorney, Agent, or Firm*—Jones & Askew, LLP

[57] ABSTRACT

A presentation system having a control window that may be invoked while the presentation system is in a slide-show mode. The control window may be displayed on a monitor, in front of a slide, within the boundary of the slide, and without resizing the slide, while the presentation system remains in the slide-show mode. The control window has the appearance of a file folder including an edit field and three tabs that may be selected to invoke three different control functions. The control functions selectively invoked by these tabs allow the user to effectively interact with the content of a slide presentation during the course of the presentation. The three tabs are notes pages tab, meeting minutes tab, and action items tab. Selecting the notes pages tab causes speaker's note associated with the current slide to be displayed in the control window. Selecting the meeting minutes tab allows the user to record a contemporaneous note during the course of the presentation. Selecting the action items tab allows the user to create new slides that are automatically appended to the end of the slide presentation. The font size of an action-item slide may be automatically adjusted, and a topic item may be moved from one action items slide to another, to avoid presenting a single "orphan" topic item on the last action-item slide.

13 Claims, 16 Drawing Sheets

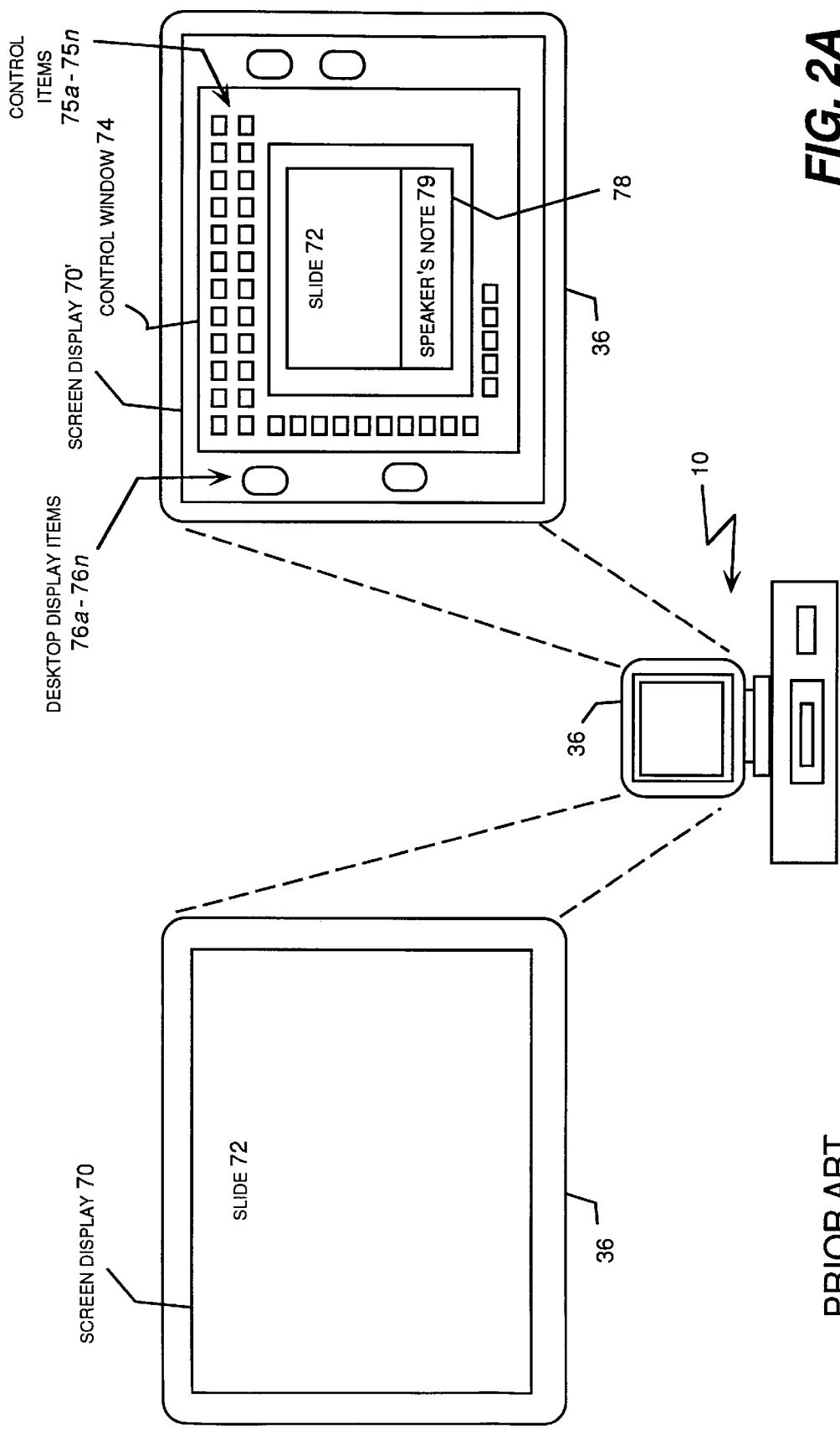

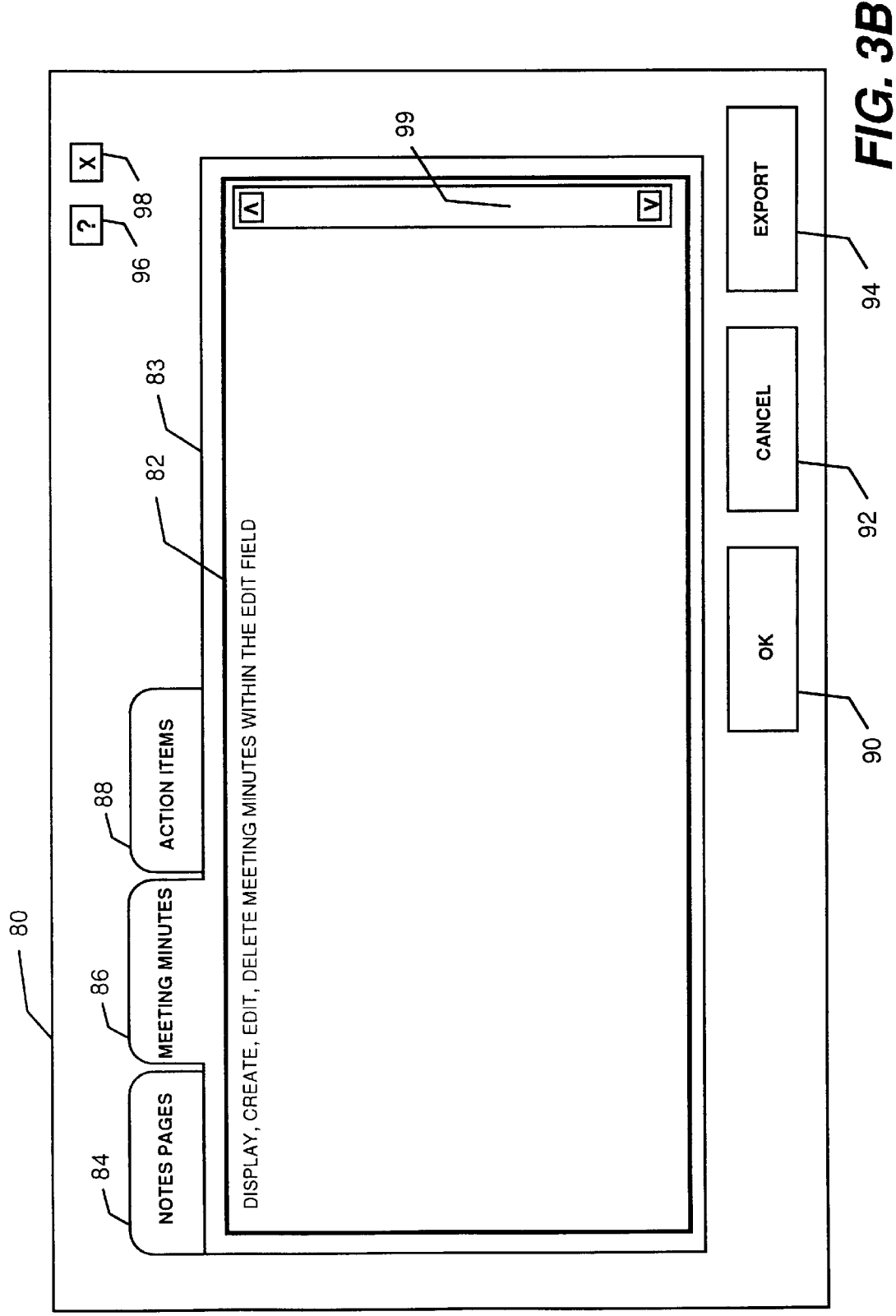

METHOD AND SYSTEM FOR INTERACTING WITH THE CONTENT OF A SLIDE PRESENTATION

TECHNICAL FIELD

The present invention relates to computer-implemented presentations systems. Specifically, the present invention relates to an improved method and system for interacting with the content of a slide presentation during the course of the presentation.

BACKGROUND OF THE INVENTION

Making presentations and conducting meetings are important aspects of many occupations. Executives make presentations to directors, managers conduct meetings with staff, salespersons make presentations to potential customers, doctors conduct meetings with nurses, lawyers make presentations to juries, and so on. A great many professionals conduct and attend meetings and presentations regularly. Much effort therefore goes into creating and delivering effective presentations and preparing for and conducting effective meetings.

With specialized software, conventional personal computers provide effective platforms for creating and conducting presentations and meetings. Currently available presentation program modules can turn a personal computer into a customized presentation system for creating and delivering slide presentations. Generally described, these presentation systems provide a specially designed, user-friendly, pallet of tools to assist in the creation of presentation slides to be subsequently displayed to an audience. These presentation systems also allow the slides to be sequentially presented to an audience, point-by-point and slide-by-slide, with color, animation, audio, and transition effects that enrich and enliven the presentation.

Additional features, beyond those provided by these conventional presentation systems, may also be advantageous. In particular, a presentation or meeting may be enhanced by the ability to interact with the content of the presentation slides during the course of the presentation or meeting. For example, the speaker may wish to refer to previously recorded speaker's notes while conducting a presentation. Typically, a speaker plans to discuss particular topics in association with particular slides. It would therefore be advantageous if the presentation system could prompt the speaker with the appropriate notes, when the corresponding slides are presented, during the course of the presentation.

Similarly, meeting minutes may have to be recorded during the course of a meeting. One of the meeting attendees is typically assigned the task of recording the meeting minutes, which are usually written on a piece of paper. This method of recording meeting minutes can be inadequate in a fast-moving meeting and, worse yet, the meeting minutes may be accidentally lost or destroyed. Moreover, it may be difficult for the taker of the meeting minutes to prepare sufficiently comprehensive notes to associate particular meeting minutes with particular slides. It would therefore be advantageous if the presentation system could record meeting minutes, and associate particular meeting minutes with particular slides, during the course of the meeting.

Action items are issues identified during the course of a meeting that require follow-up action after the meeting. Action items illustrate another situation in which it would be advantageous to interact with the content of a slide presentation during the course of a meeting or presentation. For example, a number of action items may be identified in the course of the meeting. Each action item may be assigned to a meeting attendee for followup action. At the conclusion of the meeting, the meeting attendees may wish to recapitulate the action items to ensure that all of the attendees understand the follow-up activities that were assigned during the meeting. It would therefore be advantageous if the presentation system could record the action items, and present them at the conclusion of the meeting.

Conventional presentation systems do not provide an effective means for interacting with the content of a slide presentation during the course of the presentation. This drawback arises because these conventional presentation systems have only two modes of operation, an edit mode and a slide-show mode. A user creates a set of presentation slides with the presentation system in the edit mode, and then subsequently delivers the presentation with the presentation system in the slide-show mode. During the course of the presentation, the user can interact with the content of slide presentation only by invoking the edit mode.

In the edit mode, the presentation system displays an edit-mode control window on the monitor. The edit-mode control window is typically displayed on a portion of the monitor in front of the computer's desktop display. The desktop display is therefore partially visible in the background area of the monitor. This conventional type of edit-mode display allows the user to move the control window on the display screen to access icons and control items in tool bars associated with the desktop display.

The edit-mode control window includes a viewing field and a plurality of control items organized in tool bars. To accommodate a wide range of functionality, the edit-mode control items are relatively small so that a relatively large number of control items may be provided within the edit-mode control window. For example, a typical edit-mode control window may include over sixty control items. In addition, some control items may invoke pop-up windows that display additional control items. The edit-mode control window thus provides an extensive pallet of functions for creating, printing, organizing, analyzing, and storing slides.

Illustrative functions of the edit-mode control window include text functions such as font size and style, drawing functions such as lines and polygons, background functions such as color and texture, and layout functions such as free-text and bullet-point. The user may also select among four different editing modes: slide-view, outline-view, slide-sorter, and notesview. Each editing mode corresponds to a different display of information within the viewing field of the edit-mode control window. In the slide-view mode, a fully formatted slide may be viewed and edited within the viewing field. In the outline-view mode, the content of the slide presentation may be displayed and edited in an outline layout within the viewing field. In the slide-sorter mode, the user may view and change the sequence of a plurality of slides, which are displayed in miniature.

In the notes-view mode, the user may create and view speaker's notes for each slide. The speaker's notes associated with a particular slide are displayed under the associated slide within the viewing field of the edit-mode control window. The speaker's notes generally include information to trigger the speaker's memory during the course of delivering the slide presentation. The speaker's notes may therefore be printed for use by the speaker during the delivery of the presentation.

When it is time to deliver the presentation, the slide-show mode is invoked. In the slide-show mode, the presentation system displays the slides on the entire viewing area of the monitor. The display signal transmitted to the monitor may be "split" so that it may also be transmitted to an audience display device such as an overhead or rear-screen projector. In the slideshow mode, a slide is presented on the entire viewing area of the monitor or audience display device to avoid distracting the audience with control items that are used to create or edit the slides. The desktop icons and the control items of the edit-mode control window are therefore not displayed, as these items would unnecessarily clutter the display, potentially distract the audience, and reduce the effectiveness of the slide presentation.

The slide-show mode allows the user to easily step through the presentation, point-by-point and slide-by-slide, by clicking a mouse. Each mouse click causes the next stage of the presentation to be displayed on the monitor or audience display device. Animation and transition effects may enliven the presentation as the speaker steps through the slides. A slide presentation delivered in the slide-show mode appears polished and professional. To maintain this polished and professional appearance, the user should avoid invoking the edit mode during the course of the presentation. The entire presentation should therefore be delivered in the slide-show mode.

A significant drawback arises when using these conventional presentation systems because the user cannot interact with the content of the slides while the presentation system is in the slide-show mode. For example, the presentation system cannot display the speaker's notes on the monitor, record meeting minutes, or create new slides unless the edit mode is invoked. Invoking the edit mode, however, distracts the audience because the display screen is repainted with the edit-mode control window along with a portion of the desktop display. The icons, control items, and tool bars of the desktop display and the edit-mode control window would clutter the display and appear incomprehensible to an audience viewing the display from a distance.

Interacting with content of the slide presentation during the course of the presentation is therefore quite disruptive in conventional presentation systems, as the user must toggle between the slide-show mode and the edit mode. Moreover, manipulating the presentation system in the edit mode during the course of a presentation can be cumbersome, as the edit-mode control window includes a relatively large number of relatively small control items. In view of these drawbacks associated with conventional presentation systems, there is a need for an improved method and system for interacting with the content of a slide presentation during the course of the presentation.

SUMMARY OF THE INVENTION

The present invention meets the above-described need by providing a presentation system having a control window that may be invoked while the presentation system is in the slide-show mode. The control window may be displayed on the monitor, in front of a slide, within the boundary of the slide, and without resizing the slide, while the presentation system remains in the slide-show mode. The control window includes an edit field and a plurality of control items for invoking control functions associated with the presentation program module. For example, a typical control window has the appearance of a file folder with three tabs that may be selected to invoke three different control functions. These control functions allow the user to effectively interact with the content of a slide presentation during the course of the presentation. According to an aspect of the present invention, these tabs include a notes pages tab, a meeting minutes tab, and an action items tab.

Selecting the notes pages tab causes the speaker's note associated with the current slide to be displayed on the monitor within the edit field of the control window. Speaker's notes are generally created prior to delivering a slide presentation. The speaker's note displayed in the control window are therefore the same speaker's notes that were previously created for the current slide when the presentation system was in the notes-view edit mode. The control window allows the user to view the speaker's notes associated with the current slide while the presentation system remains in the slide-show mode. The user may then edit and save these speaker's notes. Saving an altered speaker's note replaces the previously created speaker's note. The notes pages tab of the control window thus allows the user to interact with the speaker's notes during the course of the presentation, without toggling between the edit mode and the slide-show mode.

Selecting the meeting minutes tab allows the user to record a contemporaneous note during the course of the presentation. Meeting minutes may be, but generally are not, created prior to delivering a slide presentation. Providing a note-recording function that is separate from the notes pages function advantageously allows the user to differentiate contemporaneous notes, such as meeting minutes, from prerecorded notes such as the speaker's notes. In this manner, the user may record notes specific to a particular occasion, without altering the speaker's notes, which may be used to conduct presentations on subsequent occasions.

Selecting the action items tab allows the user to create new slides that are automatically entitled "Action Items" or "Action Items (continued)" and appended to the end of the slide presentation. The action-items slides are automatically formatted in bullet-point layout. Action items associated with different slides are displayed as separate topic items. In addition, multiple action items may be associated with a single slide. In this case, each data string up to a carriage return is included on an action items slide as a separate topic item. Additional action-item slides may be added, as needed. The font size of an action-item slide may be automatically adjusted, and a bullet point may be moved from one action items slide to another, to avoid presenting a single "orphan" topic item on the last action-item slide.

Generally described, the present invention provides a method for interacting with the content of slides in a presentation system. The presentation system includes a computer system, such as a conventional personal computer, and a presentation program module. The computer system includes a processing unit, a memory storage device, and a user input/output system including a monitor. The presentation program module includes instructions which, when executed by the processing unit, cause the computer system to retrieve a slide from the memory storage device and to display the slide on the monitor. While displaying the slide on the monitor, the computer system also displays a control window on the monitor within the boundary of the slide. The control window includes an edit field and a plurality of control items for invoking control functions associated with the control window. Information is then displayed in the control window.

According to a first control function of the control window, referred to as the notes pages feature, the information displayed within the control window includes a previously created note, associated with the slide, which is retrieved from the memory storage device. After the note is displayed within the control window, a command may be received from the user input/output system altering the note. The altered note may then be displayed within the control window and stored in the memory storage device.

According to a second control function of the control window, referred to as the meeting minutes feature, the information displayed within the control window includes data received from the input/output system while the control window is displayed on the monitor. This information is stored in the memory storage device in addressed locations that are linked to the addressed locations in which the slide is stored. In addition, these meeting minutes may also be exported to another program module, such as a word processing program module that resides within the memory storage device.

According to a third control function of the control window, referred to as the action items feature, the information displayed within the control window includes data received from the input/output system while the control window is displayed on the monitor. A second slide is created and the information displayed within the control window is included on the second slide, which is stored in the memory storage device. The second slide is later displayed on the monitor, for example as the last slide in the slide presentation.

More specifically described, the present invention provides a method for interacting with the content of slides in a presentation system. The presentation system includes a computer system, such as a conventional personal computer, and a presentation program module. According to this method, a first slide is retrieved from the memory storage device and displayed on the monitor. While the first slide is displayed on the monitor, a control window is displayed on the monitor.

This control window includes a first control item associated with a first control function of the presentation program module for causing a previously created note, associated with the first slide, to be retrieved from the memory storage device and displayed in the control window. The control window also includes a second control item associated with a second control function of the presentation program module for causing a second note, associated with the slide, to be created from data received from the user input/output system while the control window is displayed on the monitor. The control window also includes a third control item associated with a third control function of the presentation program module for causing a second slide to be created from data received from the user input/output system while the control window is displayed on the monitor.

Further describing the first control function of the control window, referred to as the notes pages feature, a slide is retrieved from the memory storage device and displayed on the monitor. While the slide is displayed on the monitor, a control window is displayed on the monitor within the boundary of the slide. A previously created note, associated with the slide, is retrieved from the memory storage device and displayed in the control window. In response to data received from the user input/output system, the note is altered and the altered note is stored in the memory storage device.

Further describing the second control function of the control window, referred to as the meeting minutes feature, a slide is retrieved from the memory storage device and displayed on the monitor. While the slide is displayed on the monitor, a control window is displayed on the monitor within the boundary of the slide. In response to data from the user input/output system, a note, associated with the slide, is created and displayed on the monitor. The note is then stored in the memory storage device in addressed locations that are linked to the addressed locations in which the slide is stored.

Further describing the third control function of the control window, referred to as the action items feature, a first slide is retrieved from the memory storage device and displayed on the monitor. While the slide is displayed on the monitor, a control window is displayed on the monitor. Data received from the user input/output is displayed in the control window. A second slide is then created, and the data received from the user input/output system is included in the second slide. The second slide is stored in the memory storage device, for example as the last slide in the presentation. The second slide is later displayed on the monitor.

According to a further aspect of the action items feature of the present invention, the data received from the user input/output system is formatted as a plurality of topic items. It is then determined whether the topic items fit within the boundary of the second slide. If the topic items do not fit within the boundary of the second slide, a third slide is created and the topic items are included partially in the second slide and partially in the third slide. It may further be determined whether the third slide contains only a single orphan topic item. If the third slide contains an orphan topic item, the font size of the second slide is reduced and the orphan topic item is included in the second slide. It may further be determined whether the orphan topic item fits within the boundary of the second slide. If the orphan topic item does not fit within the boundary of the second slide, the font size of the second slide is reset, the orphan topic item is included in the third slide, and a second topic item is moved from the second slide to the third slide.

BRIEF DESCRIPTION OF THE DRAWINGS

FIG. 2A, labeled "PRIOR ART," illustrates a slide-show mode screen display and an edit mode screen display associated with conventional presentation systems.

FIG. 3B illustrates the control window with a second control function selected.

DETAILED DESCRIPTION OF THE PREFERRED EMBODIMENTS

Figure 1:
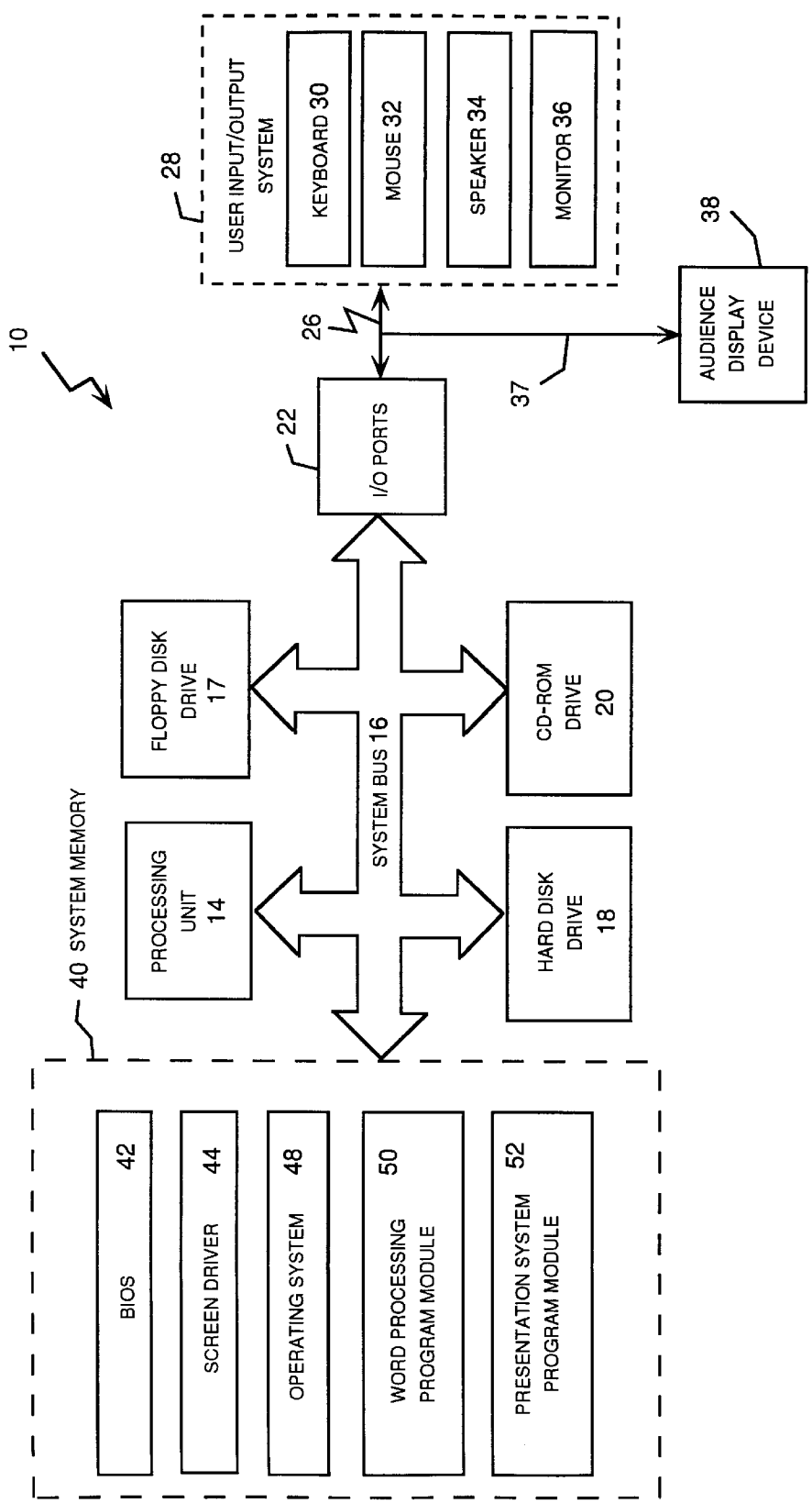
FIG. 1 is a functional block diagram of a conventional personal computer system that provides the operating environment of a disclosed embodiment of the present invention.

The described embodiments of the present invention provide a presentation system comprising a computer system including a processing unit, a memory storage device, and a user input/output system including a monitor. The presentation system also includes a presentation program module including instructions which, when executed by the processing unit, cause the computer system to retrieve a slide from the memory storage device. In response to a first command received from the user input/output system, an edit-mode control window is displayed on the monitor, and the slide is displayed within the boundary of the edit-mode control window. In response to a second command received from the user input/output system, the slide is displayed on the monitor and a meeting minder control window is displayed within the boundary of the slide. The edit-mode control window and the meeting minder control window each include an edit field and plurality of control items associated with control functions of the presentation program module, and the meeting minder control window includes fewer control items than the edit-mode control window.

The preferred meeting minder control window includes an edit field for displaying, creating, and editing information including data retrieved from the memory storage device and data received from the user input/output system while the control window is displayed on the monitor. The preferred meeting minder control window further includes six control item associated with control function of the presentation program module. In particular, the preferred control window includes a border in the shape of a file folder and three control items that appear as selectable tabs associated with the file folder. Three additional control items appear as selectable buttons below the file folder.

Selecting the first tab invokes a first control function for causing a previously created note, associated with the slide, to be retrieved from the memory storage device and displayed in the control window. Selecting the second tab invokes a second control function for causing a second note, associated with the slide, to be created from data received from the user input/output system while the control window is displayed on the monitor. Selecting the third tab invokes a third control function for causing a second slide to be created from data received from the user input/output system while the control window is displayed on the monitor. Selecting the first button invokes a fourth control function for causing data received from the user input/output system to be exported to another program module, such as a word processing program module. Selecting the second button invokes a fifth control function for saving changes made to the data associated with the first, second, and third tabs. Finally, selecting the third button invokes a sixth control function of the presentation program module for discontinuing the display of the control window without saving changes made to the data associated with the first, second, and third tabs.

The following detailed description is presented largely in terms of processes and symbolic representations of operations of data bits manipulated by a processing unit and maintained within data structures supplied by one or more memory storage devices. Such data structures impose a physical organization upon the collection of data bits stored within computer memory and represent specific electrical or magnetic elements. These algorithmic descriptions and symbolic representations are the means used by those skilled in the art of computer programming and computer construction to most effectively convey teachings and discoveries to others skilled in the art.

For the purposes of this discussion, a method or process is generally conceived to be a sequence of computer-executed steps leading to a desired result. These machine-implemented steps, which can be maintained as in the form of a program module, generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, numbers, records, files, or the like. It should be kept in mind, however, that these and similar terms should be associated with appropriate physical quantities for computer operations, and that these terms are merely conventional labels applied to these physical quantities that exist within the computer.

In addition, it should be understood that the programs, processes, methods, etc., described herein are not related or limited to any particular computer, single chip processor, or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The Operating Environment

FIG. 1 is a functional block diagram of a conventional personal computer system 10 that provides the operating environment of a disclosed embodiment of the present invention. The personal computer system 10 may be any of a variety of personal computers such as "APPLE," "IBM," or "IBM"-compatible personal computers. The computer system 10 includes a processing unit 14 connected by way of a system bus 16 with internal I/O devices including a floppy disk drive 17, hard disk drive 18, and a CD-ROM drive 20. The system bus 16 also connects the processing unit 14 with I/O ports 22 that are used to connect the computer system 10 with a plurality of external I/O devices. In particular, the I/O ports 22 are connected by way of a cable connector 26 with a user input/output system 28 including a keyboard 30, mouse 32, speaker 34, and monitor 36. It will be appreciated that additional input/output devices such as a joy stick (not shown), touch-screen (not shown), voice response unit (not shown), and the like may also be included as part of the user input/output system 28.

The cable connector 26 may optionally be "split" so that a separate audience display device 38 displays the information that is shown on the monitor 36. The audience display device 38 may be any of a variety of conventional display devices suitable for viewing by a audience from a significant distance, such as a large monitor, an overhead projector, a rear-screen projector, or the like. The audience display device 38 may improve the use of the computer system 10 as a presentation system for addressing an audience, but it is not a necessary element of the disclosed embodiment of the present invention.

The processing unit 14 is also connected by way of the system bus 16 to a system memory 40, typically a Read Only Memory (ROM) resource and a random access memory (RAM) resource, typically of at least about eight megabytes. The processing unit 14 communicates by means of control, address, and data signals with the software resident within system memory 40 including a screen driver 44 and an operating system 48. The preferred embodiment of the present invention operates in conjunction with a variety operating systems including "WINDOWS NT" and "WINDOWS 95" manufactured by Microsoft Corporation, Redmond, Wash., assignee of the present invention.

The computer system 10 has a distinct hierarchy of software retained in the system memory 40 that controls the operation of the system at all times. Communications generally occur only between adjacent levels in the hierarchy although there are some exceptions. The hardware, primarily the processing unit 14 and system memory 40, is at the lowest level in the hierarchy. External I/O devices such as the user input/output system 28 are controlled by the basic input-output system (BIOS) 42, which is at the next level in the hierarchy. The BIOS 42 writes or reads bytes of information to or from memory address ports. A memory address port is a predefined location within the system memory 40 that is dedicated to communicating with an external device such as the monitor 36, a printer, a modem, or the like.

The BIOS 42 is usually located on a ROM (not shown) and is specific to the computer that it supports. The BIOS 42 operates as an interface between the processing unit 14 and the operating system 48 by receiving instructions from the operating system and translating the instructions into manipulation of the memory address ports. The BIOS 42 provides a uniform interface between the computer's operating system software and the specific hardware configuration of a particular computer, primarily the processing unit 14 and the system memory 40, allowing standardization of operating system instructions used to control the hardware of different computers.

Device drivers that support external I/O devices operate at the next level in the hierarchy. For example, the screen driver 44 is specifically configured to communicate with the monitor 36. The screen driver 44 responds to the presence of data placed in a predefined memory address port by the BIOS 42. Specifically, the screen driver 44 transmits that data from the predefined memory address to the monitor 36 in the particular protocol required by the monitor 36 so that the data is displayed properly on the screen. The audience display device 38 should be configured to accept data using the same protocol as the monitor 36 so that the monitor 36 and the audience display device 38 present the same information in the same format. Other device drivers similarly support the other I/O devices: a floppy disk driver supports the floppy disk drive 17, a hard disk driver supports the hard disk drive 18, a CD-ROM driver supports the CD-ROM drive 20, etc.

A standardized operating system 48, preferably "WINDOWS NT" or "WINDOWS 95," operates the next level in the hierarchy. The operating system 48 is usually installed in a mass-storage computer memory such as the hard disk drive 18. During boot up (initialization) of the computer system 10, the operating system 48 and the device drivers such as the screen driver 44 are loaded into the system memory 40, usually from the hard disk drive 18. The operating system 48 provides the interface between the processing unit 14 and other higher level modules such as task-specific program modules. Generally, higher level task-specific program modules issue instructions, whereas the operating system 48 controls the operation of the processing unit 14 so that these instructions are processed in an orderly manner.

Task-specific program modules operate at the next level in the hierarchy to perform specialized functions. Common task-specific program modules include word processors, spread sheets, databases, games, etc. During operation, one or more task-specific program modules are loaded into system memory 40, usually from the hard disk drive 18, the CD-ROM drive 20, or other memory storage devices. For example, the computer system 10 preferably includes a word processing program module 50 within the system memory 40. In performing their specialized functions, the task-specific program modules send I/O instructions to the operating system 48. In response, the operating system 48 sends I/O instructions to the BIOS 42, which implements the instructions by writing data to or reading data from a memory address port. The screen driver 44 then transport the data from the memory address port to the monitor 36 to create a screen display.

The operating system 48 provides a variety of functions, services, and interfaces that allow task-specific program modules to easily deal with various types of I/O. This allows the task-specific program modules to issue relatively simple function calls that cause the operating system 48 to perform the steps required to accomplish various tasks, such as displaying information on the monitor 36, printing text on an attached printer (not shown), or transmitting data between task-specific program modules. Transmitting data between task-specific program modules, which may require invoking the target task-specific program module, opening a file within the between task-specific program modules, and formatting the transmitted data to be compatible with the target task-specific program module, is known a "exporting" the data.

The Programming Environment

A preferred embodiment of the present invention is represented by the presentation system program module 52. A commercial embodiment including many aspects of the present invention is represented by "POWERPOINT 95" sold by Microsoft Corporation. More specifically, many aspects of the present invention are embodied in the "meeting minder" feature of "POWERPOINT 95." This feature includes a meeting minder control window that may be displayed while the presentation system program module 52 is operating in the slide-show mode or in the edit mode. When implemented with the presentation system program module 52 operating in the slide-show mode, the meeting minder control window provides an easy-to-use user interface including selectable control functions that are specifically designed to allow a user to effectively interact with the content of a slide presentation during the course of the presentation.

The meeting minder feature of "POWERPOINT 95" may be created within a programming environment that is provided as part of the "MICROSOFT OFFICE" suite of program modules. "MICROSOFT OFFICE" includes "MICROSOFT WORD" and "POWERPOINT 95," the preferred word processing program module 50 and presentation system program module 52, respectively. "MICROSOFT OFFICE" also includes and supports a "VISUAL BASIC" programming environment that allows a programmer to create objects including control windows that interact with "POWERPOINT 95" and "MICROSOFT WORD." The meeting minder feature described herein, including the meeting minder control window and the associated control functions, may therefore be created within the "VISUAL BASIC" programming environment supported by "MICROSOFT OFFICE." It should be understood, however, that embodiments of the present invention can readily be created in other programming environments and implemented in connection with other operating systems, such as Microsoft Corporation's "WINDOWS 3.1" operating system, IBM Corporation's "OS/2" operating system, and the operating system used in "MACINTOSH" computers manufactured by Apple Computer, Inc.

The "MICROSOFT OFFICE" suite of program modules are advantageously configured as cooperating sets of object-oriented program modules. It should be appreciated that object-oriented program modules and the operating systems that support them are quite complex and provide a wide variety of services and interfaces that allow users and program modules to utilize the resources available in the personal computer system 10. For more comprehensive information regarding the "WINDOWS 95" and "WINDOWS NT" operating systems and its interaction with object-oriented program modules, the reader may refer to the "Win32 Programmer's Reference" published by Microsoft Press and "Advanced Windows" published by Microsoft Press.

The "WINDOWS 95" and "WINDOWS NT" operating systems support Microsoft Corporation's Object Linking and Embedding (OLE) and OLE Automation interfaces. OLE and OLE Automation support a variety of application programming interfaces (APIs) that simplify the interaction between program modules. Programming with OLE and OLE Automation is familiar to those skilled in the art and will therefore not be further described, except to point out a few specific aspects of the programming environment that are of particular importance to the disclosed embodiment of the present invention. For more comprehensive information regarding the OLE and OLE Automation, the reader may refer to the "OLE 2 Programmer's Reference" published by Microsoft Press.

OLE and OLE Automation represent a technology that enables developers to create extensible programs modules that operate across multiple platforms. OLE-enabled program modules allow users to manipulate information in an intuitive manner, using an environment that is more "document-centric" and less "application-centric." Users can create compound documents with data, or objects, of different formats, and focus directly on the data rather than on the application programs responsible for the data. The data can be embedded within the document, or linked to it, so that only a reference to the data is stored in the document.

OLE facilitates application integration by defining a set of standard interfaces, which are groupings of semantically related functions through which one program module accesses the services of another. An interface thus provides a data structure, syntax, and protocol for communicating predefined instructions or data with an object. OLE is an open system in the sense that any program module can expose a defined interface, and thereby "teach" any other program module to use it. Task-specific program modules may therefore take advantage of the built-in functionality provided by the standard OLE interfaces, or create new interfaces as best suits their needs.

OLE Automation provides a way to interact with a program module from outside that program module. OLE Automation allows a programmer to access and create tools and interfaces that manipulate objects. "POWERPOINT 95" exposes an OLE Automation object model that a programmer may interact with through the "VISUAL BASIC" programming environment. This "VISUAL BASIC" programming environment, along with the OLE Automation object model exposed "POWERPOINT 95," may therefore be used to create the disclosed embodiment of the present invention as described herein.

One particular interface of the OLE Automation object model exposed "POWERPOINT 95," known as the "tag" interface, is of particular importance to the disclosed embodiment of the present invention. The tag interface allows data to be embedded within an object. Any object in a "POWERPOINT 95" document, such as a slide presentation, an individual slide, or a component of a slide, may therefore be operated on by the tag interface. Tagging data to an object causes an array containing a "namevalue" pair defining the tagged data to be stored with the object. The tagged data is thus stored in memory address locations that are linked to the memory address locations in which the object is stored.

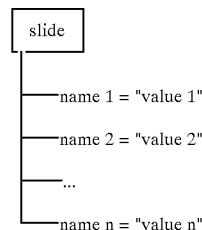

The syntax of the tag interface is as follows:

object. tag.add(name,value)

This command causes an array containing the data in the "name" and "value" fields to be tagged to the object identified in the "object" field. For example, the following command may be used to cause the data "this is a meeting minute" to be named "meeting minute" and tagged to an object named "slide(1)":

slide(1).tag(meeting minute,this is a meeting minute)

Any number of name-value pairs may be tagged to an object. Thus, tagging "n" name-value pairs to an object causes an "n by 2" array containing "n" name-value pairs to be embedded within the object. The syntax is:

[object].tags add(name,value)

As described more fully below, the meeting minder control window allows data (specifically, meeting minutes) to be tagged to slides within a "POWERPOINT 95" slide presentation. To place the meeting minder control window in context, a brief description of the operation of conventional presentations systems will precede the description of the operation of the meeting minder control window.

Prior Art Presentation Systems

FIG. 2A, labeled "PRIOR ART," illustrates a slide-show mode screen display 70 and an edit mode screen display 70' associated with conventional presentation systems, such as those utilizing "POWERPOINT" versions 1.0 through 6.0, manufactured by Microsoft Corporation. These conventional presentation systems typically have only two modes of operation, a slide-show mode associated with the slide-show mode screen display 70, and an edit mode associated with the edit mode screen display 70'. A user creates a set of presentation slides using the edit-mode screen display 70', and then subsequently delivers the presentation preferably using only the slide-show screen display 70. Referring to FIG. 1, it should be understood that the screen displays 70 and 70' are typically displayed on the monitor 36 and may also be displayed on a separate audience display device 38.

As shown in FIG. 2A, in the slide-show mode, a slide 72 is displayed on the entire viewing area of the monitor 36. As the presenter wants the audience to focus its attention on the slide, the slide 72 is presented on the entire viewing area of the monitor 36 to avoid distracting the audience with other program module display items, such as icons, control items, tool bars, and the like. The slide-show mode allows the user to easily step through the presentation, point-by-point and slide-by-slide, by clicking the mouse 32 or by pressing a selected key on the keyboard 30. Each mouse click or keystroke causes the next stage of the presentation to be displayed on the monitor 36. A slide presentation delivered in the slide-show mode therefore appears polished and professional. To maintain this polished and professional appearance, the user should avoid invoking the edit mode during the course of the presentation. Thus, the entire presentation should be conducted in the slide-show mode.

In the edit mode, the screen display 70' includes an edit-mode control window 74 comprising a plurality of control items 75a through 75n. To accommodate a wide range of functionality, the edit-mode control items 75a through 75n are relatively small so that a relatively large number of control items may be provided within the edit-mode control window 74. The standard "POWERPOINT" edit-mode control window, for instance, includes over sixty control items. In addition, some control items invoke pop-up windows presenting the user with additional control items. The edit-mode control window 74 thus provides an extensive pallet of control functions for creating, printing, organizing, analyzing, and storing presentation slides.

The edit-mode control window 74 is displayed on a portion of the monitor 36 in front of the computer's desktop display. The desktop display typically includes a plurality of desktop display items 76a through 76n that may be wholly or partially visible in the background area of the screen display 70'. This conventional type of display allows the user to move the control window 74 within the screen display 70' so that the user may access the desktop display items 76a through 76n.

In addition to the control items 75a through 75n, the edit-mode control window 74 includes a viewing field 78. The user may select among four different editing modes: slide-view, outline-view, slide-sorter, and notes-view. Each editing mode corresponds to a different display of information within the viewing field 78 of the edit-mode control window 74. For example, in the notes-view mode, the user may create and view speaker's notes for each slide. For example, a speaker's note 79 associated with a slide 72 may be displayed under the slide within the viewing field 78 of the editmode control window 74, as shown in FIG. 2A.

With these conventional presentation systems, the user can only interact with the content of a slide presentation during the course of the presentation by invoking the edit mode, and thereby replacing the slide-show screen display 70 with the edit mode screen display 70'. As shown in FIG. 2A, toggling from the slide-show screen display 70 to the edit mode screen display 70' causes a drastic change in the appearance of the screen display. The slide 72 dominates the slide-show screen display 70, whereas the control window 74 dominates the edit mode screen display 70'. Moreover, the edit mode screen display 70' is considerably more cluttered than the slide-show screen display 70. It has therefore been found that invoking the edit mode during the course of a presentation can distract the audience, and reduce the effectiveness of the slide presentation.

The Disclosed Embodiment of the Present Invention

Figure 2B:
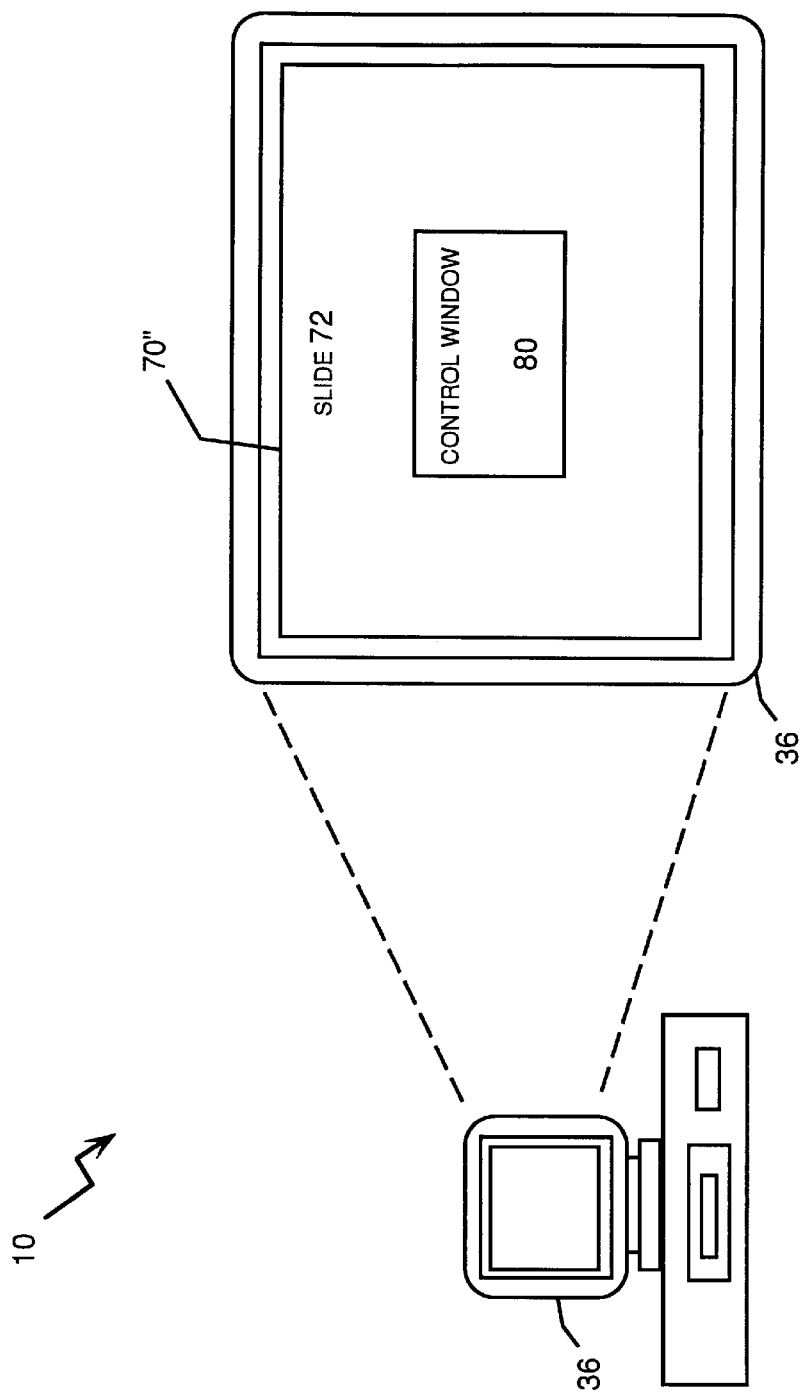
FIG. 2B illustrates a screen display for a presentation system including a control window displayed within the boundary of a slide.

FIG. 2B illustrates a screen display 70" for a presentation system including a control window 80 displayed within the boundary of a slide 72. The screen display 70' illustrates the meeting minder feature available in presentation systems utilizing "POWERPOINT 95." It should be understood, however, that the present invention is not limited to the commercial embodiment represented by the meeting minder feature available in presentation systems utilizing "POWERPOINT 95." It should be further understood that the screen display 70" is preferably provided in addition to the screen displays 70 and 70' shown in FIG. 2A. The control window 80 may be displayed in front of the slide 72, within the boundary of the slide 72, and without resizing or otherwise altering the appearance of the slide 72, as shown in FIG. 2B. The screen display 70" minimizes audience distraction while allowing the user to interact with the content of the slide presentation through the operation of the meeting minder control window 80.

The meeting minder control window 80 is preferably activated by selecting a "meeting minder" menu item from a pop-up menu. The pop-up menu may be activated from the slide-show mode with a slide 72 displayed on the monitor 36 (FIG. 2A) by right-clicking the mouse 32, or by placing the cursor over a semi-transparent control item displayed in the bottom-left corner of the screen display 70 and clicking the mouse 32. The user may then activate the meeting minder control window 80 by selecting the meeting minder menu item from the pop-up menu. The user can select the meeting minder menu item by placing the cursor over the meeting minder menu item and clicking the mouse 32.

In response to the selection of the meeting minder menu item, the control window 80 appears on the monitor 36 within the boundary of the slide 72, as shown FIG. 2B. It will be appreciated that the control window 80 may equivalently be displayed in another area of the monitor 36. In particular, the control window 80 could equivalently be displayed in a corner of the screen display 70' so that a portion of the boundary of the control window 80 coincides with a portion of the boundary of the slide 72. Moreover, the slide 72 may equivalently be resized or altered somewhat in appearance. In particular, the slide 72 may equivalently be resized and the control window 80 positioned so that a portion of the boundary of the control window 80 lies outside a portion of the boundary of the slide 72.

Alternatively, the meeting minder control window 80 may be activated with the presentation system in the edit mode. From the edit mode, the meeting minder control window 80 is preferably activated by selecting a "meeting minder" menu item from a pop-up menu that is activated by selecting a predefined one of the control items 75 of the edit-mode control window 74. Accessing the meeting minder control window 80 from the edit mode allows a user to create speaker's notes, meeting minutes, and action items slides while the presentation system is in any of the four editing modes: slide-view, outline-view, slide-sorter, and notes-view.

Figure 3A:
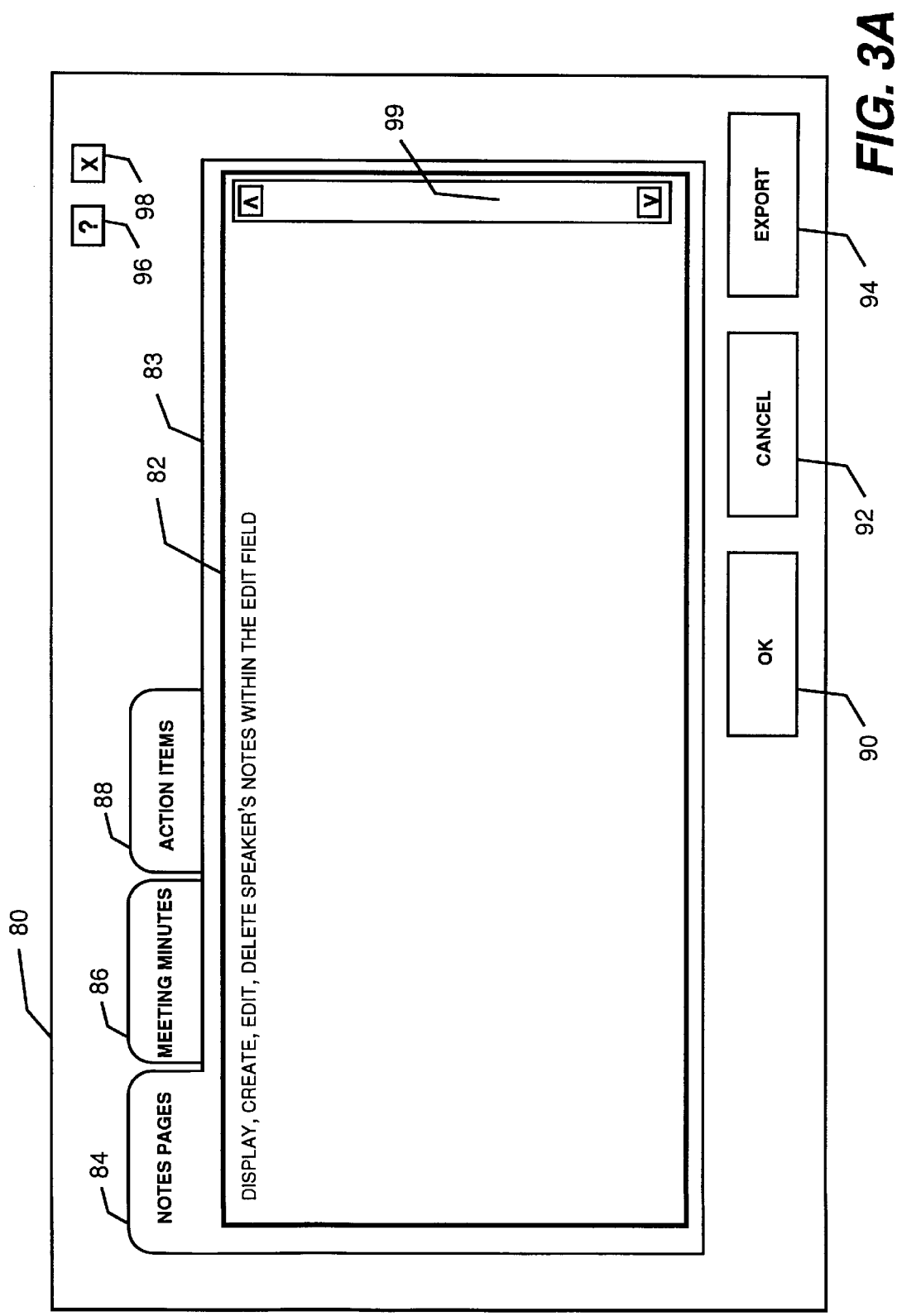
FIG. 3A illustrates a control window for a presentation system with a first control function selected.

FIG. 3A illustrates the control window 80 with a first control function selected. The control window 80 includes an edit field 82 within a border 83 in the shape of a file folder with three selectable tabs, the note pages tab 84, the meeting minutes tab 86, and the action items tab 88. Each tab corresponds to a control function of the meeting minder control window 80. The user selects the note pages tab 84 (i.e., activates the control function associated with the notes pages tab 84) by placing the cursor over the notes pages tab 84 and clicking the mouse 32. When the notes pages tab 84 is selected, the note pages tab 84 appears integral with file-folder-shaped border 83, as shown in FIG. 3A.

Selecting the note pages tab 84 may cause previously created speaker's notes associated with the current slide to be retrieved from a memory storage device, such as the hard disk drive 18, and displayed in the edit field 82. If there are no previously created speaker's notes associated with the current slide, the edit field 82 appears empty. The user may then activate the edit field 82 by transmitting a "go" command. The preferred "go" command is transmitted by placing the cursor within the exit field 82 and clicking the mouse 32. In response, a display item such as a conventional text cursor appears at the end of the speaker's note or, if edit field 82 is empty, at the first character of the edit field. The user may then create, edit, or delete the speaker's notes in a conventional manner. It will be appreciated that the keyboard 30, the mouse 32, and other elements of input/output system 28 such as a touch screen may be used to create, edit, or delete the information displayed within the edit field 82.

FIG. 3B illustrates the control window 80 with the meeting minutes tab 86 selected. The user selects the meeting minutes tab 86 (i.e., activates the control function associated with the meeting minutes tab 86) by placing the cursor over the meeting minutes tab 86 and clicking the mouse 32. When the meeting minutes tab 86 is selected, the meeting minutes tab 86 appears integral with the file-folder-shaped border 83, as shown in FIG. 3B. The control window 80 is preferably initially activated in the meeting minutes mode. In other words, each time the control window 80 is activated for the disclosed embodiment, it initially appears with the meeting minutes tab 86 selected.

Selecting the meeting minutes tab 86 may cause previously created meeting minutes associated with the current slide to be retrieved from a memory storage device, such as the hard disk drive 18, and displayed in the edit field 82. If there are no previously created meeting minutes associated with the current slide, the edit field 82 appears empty. The user may then activate the edit field 82 by placing the cursor within the exit field 82 and clicking the mouse 32. In response, a conventional text cursor appears at the end of the meeting minutes or, if edit field 82 is empty, at the first character of the edit field. The user may then create, edit, or delete the meeting minutes in a conventional manner.

Figure 3C:
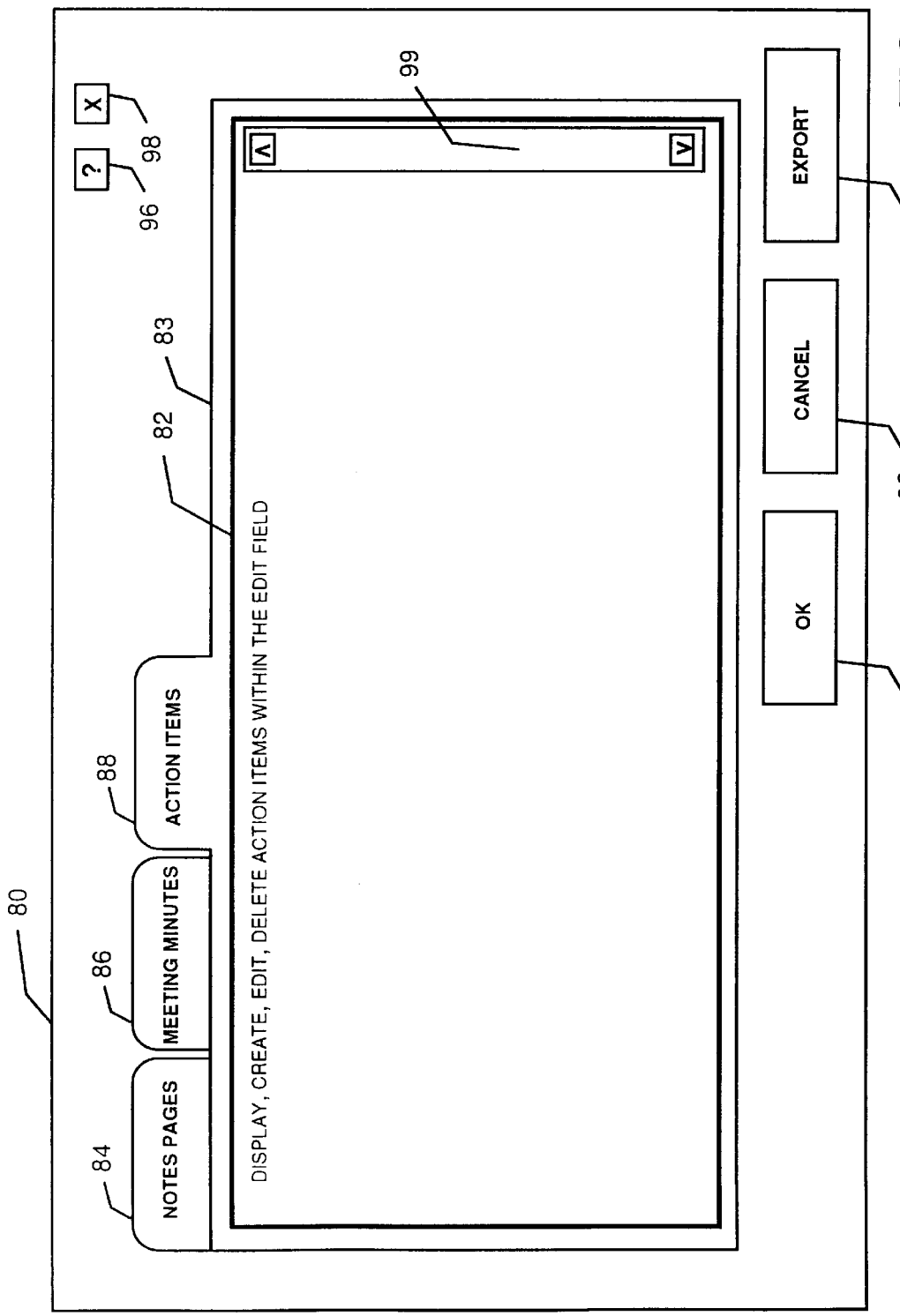
FIG. 3C illustrates the control window with a third control function selected.

FIG. 3C illustrates the control window 80 with the action items tab 88 selected. The user selects the action items tab 88 (i.e., activates the control function associated with the action items tab 88) by placing the cursor over the action items tab 88 and clicking the mouse 32. When the action items tab 88 is selected, the action items tab 88 appears integral with the file-folder-shaped border 83, as shown in FIG. 3C.

Selecting the action items tab 88 may cause previously created action items associated with the current slide presentation (i.e., all of the action items associated with all of the slides of the current slide presentation) to be retrieved from a memory storage device, such as the hard disk drive 18, and displayed in the edit field 82. If there are no previously created action items associated with the current slide presentation, the edit field 82 appears empty. The user may then activate the edit field 82 by placing the cursor within the exit field 82 and clicking the mouse 32. In response, a display item such as a conventional text cursor appears at the end of the action items or, if edit field 82 is empty, at the first character of the edit field. The user may then create, edit, or delete the action items in a conventional manner.

Referring the FIGS. 3A–3C, the meeting minder control window 80 also includes an OK button 90, which the user selects (i.e., activates the control function associated with the OK button 90) by placing the cursor over the OK button 90 and clicking the mouse 32. Selecting the OK button 90 causes the information created or edited in the edit field 82 to be saved in a memory storage device, such as the hard disk drive 18. Depending on the changes entered by the user during the current meeting minder session, selecting the OK button 90 may cause information associated with the notes pages tab 84, the meeting minutes tab 86, and the action items tab 88 to be saved. The control window 80 is then discontinued.

The speaker's notes saved through the operation of the meeting minder control window 80 are the same speaker's notes that may be created and saved through the operation of the edit-mode control window 74 when the presentation program module 52 is in the notes-view mode. Saving speaker's notes created or edited through the operation of the control window 80 therefore augments or replaces the speaker's notes created and saved through the operation of the edit-mode control window 74 when the presentation program module 52 is in the notes-view mode.

Each meeting minute created and saved through the operation of the meeting minder control window 80, on the other hand, is saved by tagging the meeting minute to the slide that was current when the meeting minute was created. As described previously, tagging a meeting minute to a slide causes the meeting minute to be stored in an array as a name-value pair embedded within the slide. The memory address locations in which the meeting minute is stored are thus linked to the memory address locations in which the slide is stored.

The action items saved through the operation of the meeting minder control window 80 are automatically stored as one or more new slides that are appended at the end of the slide presentation. The action items slides may thereafter be manipulated from the edit mode like any other slide in the presentation. The action items slides are automatically formatted with the attributes of the slide master (i.e., default parameters) in a standard "bulletlist" layout. The first action items slide is automatically entitled "Action Items" and subsequent action items slides are entitled "Action Items (continued)." Action items associated with different slides are included on the action items slides as separate topic items. In addition, multiple action items may be associated with a single slide. In this case, each data string up to a carriage return is included on an action items slide as a separate topic item.

An action items slide is initially given a default font size, preferably of 32 points, which limits a typical slide to eight lines. Thus, any combination of action items comprising eight lines of data is typically displayed on one action items slide. If there are more than eight lines of data, however, an attempt is made to fit the data on the slide. As a first measure, the line spacing is reduced, preferably by ten percent. If the data still does not fit on the slide, the font size is reduced, preferably by four points. If the data still does not fit on the slide, a new action items slide is created and overflow action items (i.e., action items in excess of one) are transferred to the new slide. This process is repeated and new slides are added until all of the action items are assigned to a slide.

If the last slide contains a single orphan topic item, an attempt is made to add the orphan action item to the next-to-last slide. The font size of the next-to-last slide is reduced a second time, again preferably by four points, and the orphan topic item is added to the next-to-last slide. It is then determined whether all of the data assigned to the next-to-last slide fits within the boundary of the slide. If the data fits, the orphan topic item remains on the next-to-last slide and the last slide is deleted. If the orphan topic item still does not fit on the next-to-last slide, the font size of the next-to-last slide is reset and an attempt is made to include two topic items on the last slide.

If the next-to-last slide includes at least four action items, the last two action items are moved to the last slide. It is then determined whether all of the data assigned to the last slide fits within the boundary of the slide. If the data assigned to the last slide fits, the last two topic items remain on the last slide. If the data assigned to the last slide does not fit, the line spacing and font size of the last slide may be reduced. If the data assigned to the last slide then fits, the last two topic items remain on the last slide. Otherwise, only the orphan topic item is displayed on the last slide.

Topic items are typically relatively short statements. Some users, however, may create very long topic items. If the data comprising a single topic item is too long to fit on a single slide, the overflow data is typically not displayed. Alternatively, this type of overflow data may be displayed on a subsequent slide. Other options for handling very long topic items include further reducing the font size of the slide, discontinuing the acceptance of data beyond a predefined number of characters, or displaying an error message upon receiving a predefined number of characters.

The meeting minder control window 80 also includes a cancel button 92, which the user selects (i.e., activates the control function associated with the cancel button 92) by placing the cursor over the cancel button 92 and clicking the mouse 32. Selecting the cancel button 92 causes the control window 80 to be discontinued without saving any changes. Depending on the changes entered by the user, selecting the cancel button 92 may cause changes associated with the notes pages tab 84, the meeting minutes tab 86, and the action items tab 88 to be canceled.

The control window 80 also includes an export button 94, which the user selects (i.e., activates the control function associated with the export button 94) by placing the cursor over the export button 94 and clicking the mouse 32 or pressing a selected key of the keyboard 30. Selecting the export button 94 causes an export control window to be displayed that allows the user to select either or both of two export functions: (1) export to the word processing program module 50, and (2) append meeting minutes to speaker's notes.

Selecting the first export function causes the meeting minutes and the action items to be exported to the word processing program module 50. Exporting the meeting minutes and the action items causes the word processing program module 50 to be activated, a new word processing file to be opened, and the raw data comprising the meeting minutes and the action items to be included in the new word processing file. The user may then save, edit, delete, or otherwise manipulate the raw data in the new word processing file as provided for by the word processing program module 50. The export control window and the meeting minder control window 80 are then discontinued. It will be appreciated that the meeting minutes, the action items, and other elements of a slide presentation may equivalently be exported other program modules, including an e-mail program such as Microsoft's "OUTLOOK", a scheduling program such as Microsoft's "SCHEDULE +", or the like.

Selecting the second export function associated with the export button 94 causes the meeting minutes associated with each slide to be appended to the speaker's notes associated with the respective slide. In other words, the second export function causes the meeting minutes to be turned into speaker's notes, just as if they had been entered into the control window 80 with the notes pages tab 84 selected or entered into the viewing field 78 of the edit-mode control window 74 with the presentation system in the notes-view edit mode. The export control window and the meeting minder control window 80 are then discontinued.

The meeting minutes control window 80 also includes three standard windows features, the help button 96, the quit button 98, and the slide-bar 99. These standard windows features will only be described briefly. The help button 96 activates help balloons that provide explanatory information regarding control items within the control window 80. The quit button 98 dismisses the control window 80 without saving any data. The quit button 98 performs the same function as the cancel button 92. The help utility activated by the help button 96 provides an explanation of the operation of the cancel button 92 but not of the operation of the quit button 98. The slide-bar 99 allows the user the scroll through data within the edit field 83.

Operation of the Disclosed Embodiments

Figure 4:
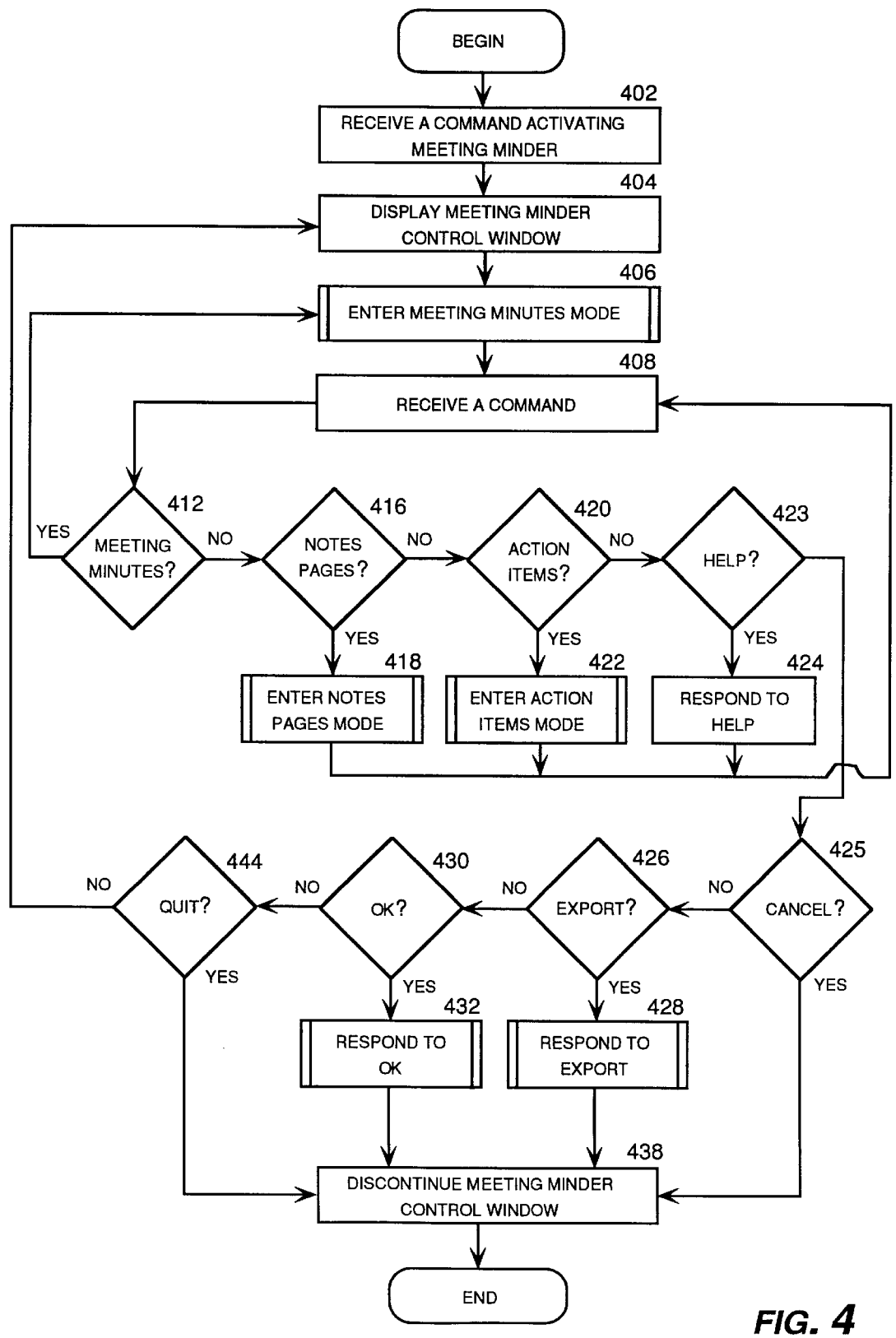
FIG. 4 is a logic flow diagram illustrating a computer-implemented process for operating a control window for a presentation system in accordance with a disclosed embodiment of the present invention.

FIG. 4 is a logic flow diagram illustrating a computer-implemented process for operating the meeting minder control window 80. In step 402, a command is received activating the meeting minder control window 80. This activation command is typically the selection of a meeting minder menu item from a pop-up menu. This pop-up menu may by activated when the user right-clicks the mouse 32, or when the user places the cursor over a semi-transparent button positioned in the lower left hand corner of the monitor 36 and clicks the mouse 32. It will be appreciated that other user commands could equivalently be used to activate the meeting minder control window 80, such as a touch screen command or a command from the keyboard 30.

In step 404, the meeting minder control window 80 is displayed on the monitor 36. When the meeting minder control window 80 is activated with the presentation system program module 52 in the slide-show mode, the meeting minder control window 80 is displayed in the center of the monitor 36 on top of, and within the boundary of, the current slide 72, as shown on FIG. 2B. The meeting minder control window 80 may also be activated when the presentation system is in the edit mode. When activated with the presentation system in the edit mode, the meeting minder control window 80 is preferably displayed on top of, and within the boundary of, the edit mode control window 74 in the center of the monitor 36.

Step 404 is followed by routine 406, in which the meeting minder control window 80 enters the meeting minutes mode. As shown in FIG. 4, the control window 80 is preferably initially activated in the meeting minutes mode. The operation of the meeting minutes mode of the control window 80 is described with more particularity with respect to FIG. 6 below. Routine 406 is followed by step 408, in which a command is received from the user input/output system 28. At this point, the user may only activate the edit field 82 in the meeting minutes mode, as described below with respect to FIG. 6, or select one of the control functions of the control window 80. These control functions are represented by the note pages tab 84, the meeting minutes tab 86, the action items tab 88, the OK button 90, the cancel button 92, the export button 94, the help button 96, or the quit button 98. Other commands, such as entries from the keyboard 30, are ignored. It is noted that mouse commands have keyboard command equivalents. For example, the user may use the "tab" or "arrow" keys to change the selected control item. If the edit box 82 is selected using these keyboard commands, the user may begin entering or editing text.

In decision step 412, it is determined whether the command received in step 408 is a selection of the meeting minutes tab 86. If the command is a selection of the meeting minutes tab 86, the "YES" branch is followed from step 412 to routine 406, in which the control window 80 enters the meeting minutes mode. The operation of the meeting minutes mode of the control window 80 is described with more particularity with respect to FIG. 6 below.

If the command received in step 408 is not a selection of the meeting minutes tab 86, the "NO" branch is followed from step 412 to decision step 416, in which it is determined whether the command is a selection of the note pages tab 84. If the command is a selection of the note pages tab 84, the "YES" branch is followed from step 416 to routine 418, in which the control window 80 enters the note pages mode. The operation of the note pages mode of the control window 80 is described in more detail with respect to FIG. 5 below.

If the command received in step 408 is not a selection of the note pages tab 84, the "NO" branch is followed from step 416 to decision step 420, in which it is determined whether the command is a selection of the action items tab 88. If the command was a selection of the action items tab 88, the "YES" branch is followed from step 420 to routine 422, in which the control window 80 enters the action items mode. The actions item mode is described with more particularity with respect to FIG. 7 below.

If the command received in step 408 is not a selection of the action items tab 88, the "NO" branch is followed from step 420 to decision step 423, in which it is determined whether the command is a selection of the help button 96. If the command is a selection of the help button 96, the "YES" branch is followed from step 423 to step 424, in which the presentation program module 52 responds to the help command in a conventional manner. Generally, selection of the help button 96 causes a balloon to be displayed that provides explanatory information regarding a selected control item within the control window 80.

If the command received in step 408 is not a selection of the help button 96, the "NO" branch is followed from step 423 to decision step 425, in which it is determined whether the command is a selection of the cancel button 92. If the command is a selection of the cancel button 92, the "YES" branch is followed from step 425 to step 438, in which the meeting minder control window 80 is discontinued. Following step 438, the computer-implemented process illustrated by FIG. 4 is concluded. Selection of the cancel button 92 deletes changes to speaker's notes, meeting minutes, and/or action items that were entered while the control window 80 was most recently active.

If the command received in step 408 is not a selection of the cancel button 92, the "NO" branch is followed from step 425 to decision step 426, in which it is determined whether the command is a selection of the export button 94. If the command is a selection of the export button 94, the "YES" branch is followed from step 426 to routine 428, in which the control window 80 responds to the export command. The operation of the export command is described with more particularity with respect to FIG. 8 below. Routine 428 is followed by step 438, in which the meeting minder control window 80 is discontinued. Following step 438, the computer-implemented process illustrated by FIG. 4 is concluded.

If the command received in step 408 is not a selection of the export button 94, the "NO" branch is followed from step 426 to decision step 430, in which it is determined whether the command is a selection of the OK button 90. If the command is a selection of the OK button 90, the "YES" branch is followed from step 430 to routine 432, in which the control window 80 responds to the OK command. The operation of the OK command is described with more particularity with respect to FIG. 9 below. Routine 432 is followed by step 438, in which the meeting minder control window 80 is discontinued. Following step 438, the computer-implemented process illustrated by FIG. 4 is concluded.

If the command received in step 408 is not a selection of the OK button 90, the "NO" branch is followed from step 430 to decision 444, in which it is determined whether the command is a selection of the quit button 98. If the command is a selection of the quit button 98, the "YES" branch is followed from step 444 to step 438, in which the meeting minder control window 80 is discontinued. Following step 438, the computer-implemented process illustrated by FIG. 4 is concluded.

If the command received in step 408 is not the selection of the quit button 98, the user has not transmitted a valid command, and the "NO" branch is therefore followed back to step 404, in which the meeting minder control window 80 is displayed on the monitor 36. It will therefore be appreciated that the control window 80 remains displayed on the monitor 36 until a valid command is received from the user input/output system 28 as described above, or until the user activates the edit field 82, as described below with respect to FIGS. 5, 6, and 7. It should be understood that the user may sequentially activate the meeting minutes tab 84, notes pages tab 86, and action items tab 88 during a single active session of the meeting minder control window 80.

Figure 5:
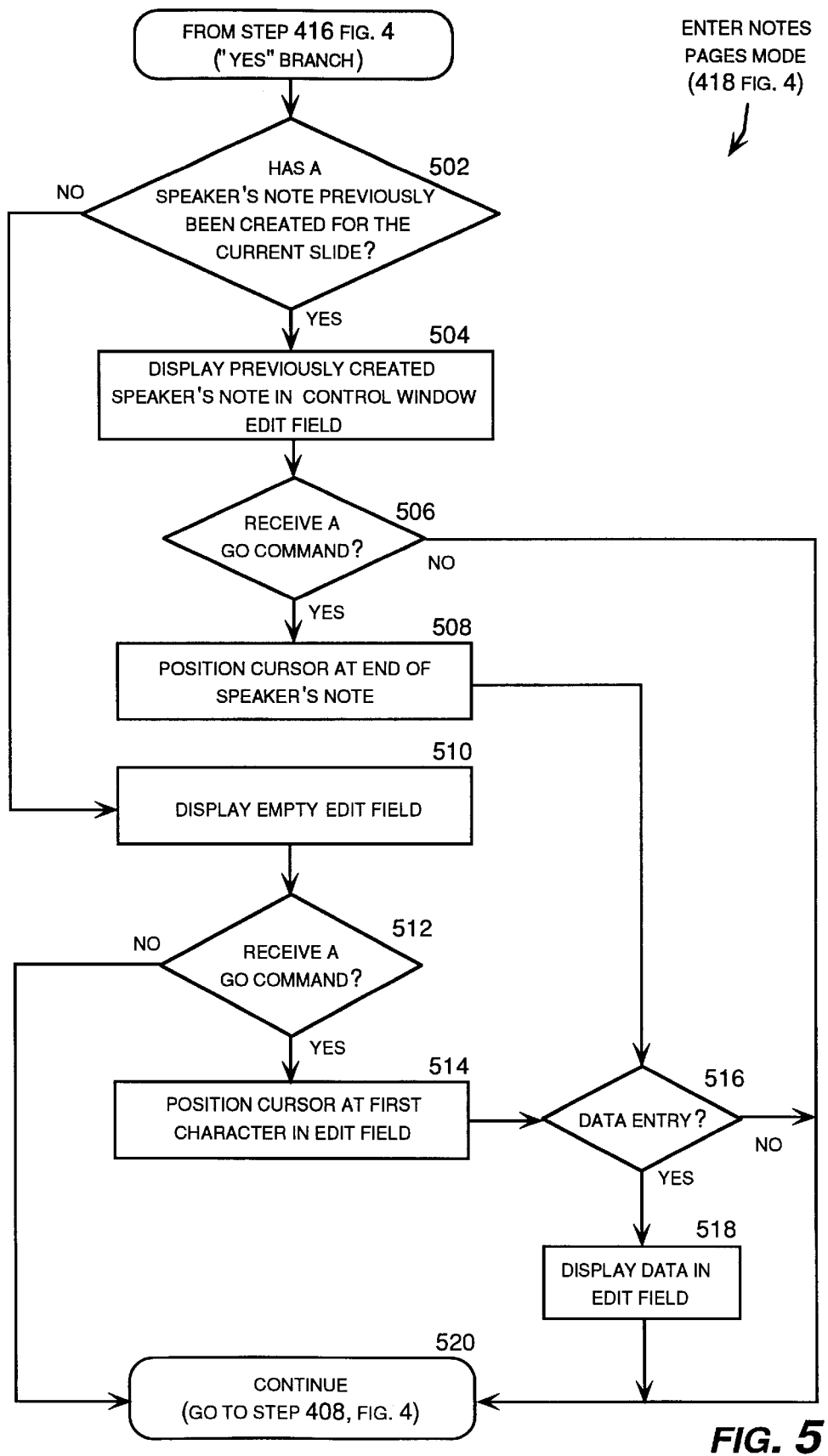
FIG. 5 is a logic flow diagram illustrating a computer-implemented process for a first control function associated with a control window for a presentation system.

FIG. 5 is a logic flow diagram illustrating a computer-implemented process for a control function associated with note pages tab 84 of the meeting minder control window 80. The computer-implemented process illustrated by FIG. 5 corresponds to routine 418 shown in FIG. 4. FIG. 5 therefore begins at the "YES" branch of step 416, which is followed in response to a determination that the command received in step 408 is a selection of the note pages tab 84.

In step 502, it is determined whether any speaker's notes have been previously created for the current slide. It should be noted that these speaker's notes may have been previously created through the operation of the control window 80, or through the operation of the edit-mode control window 74 with the presentation system in the notes-view edit mode. If speaker's notes have been previously created for the current slide, the "YES" branch is followed to step 504, in which the previously created speaker's notes are displayed in the edit field 82 of the control window 80. Step 504 is followed by decision step 506, in which it is determined whether the edit field 82 has been activated. The edit field 82 is activated when a "go" command is received from the user input/output system 28. A "go" command is preferably transmitted by placing the cursor within the edit field 82 and clicking the mouse 32 or pressing a selected key of the keyboard 30.

If a "go" command is not received in step 506, the "NO" branch is followed from decision step 506 to step 520, in which the computer-implemented process illustrated by FIG. 5 is concluded. Following step 520, the computer-implemented process illustrated by FIG. 4 continues at step 408. If a "go" command is received from the user input/output system 28, the "YES" branch is followed from step 506 to step 508. In step 508, a display item, typically a conventional text cursor, is placed at the end of the speaker's notes, which are displayed within the edit field 82 of the control window 80. Step 508 is followed by decision step 516, in which it is determined whether data is received from the user input/output system 28. If no data is received, the "NO" branch is followed from step 516 to step 520, in which the computer-implemented process illustrated by FIG. 5 is concluded.

If data is received in step 516, the "YES" branch is followed from step 516 to step 518, in which the edited data is displayed within the edit field 82 of the control window 80. Step 518 is followed by step 520, in which the computer-implemented process illustrated by step 520 is concluded. Referring again to decision step 502, if a speaker's note has not been previously created for the current slide, the "NO" branch is followed from step 502 to step 510, in which the control window 80 is displayed with the edit field 82 empty. In decision step 512, it is determined whether a "go" command is received from the user input/output system 28. Again, a "go" command is preferably transmitted by placing the cursor within the edit field 82 and clicking the mouse 32. If a "go" command is not received, the "NO" branch is followed from step 512 to step 520, in which the computer-implemented process illustrated by FIG. 5 is concluded.

If a "go" command is received in step 512, a display item, typically a conventional text cursor, is placed at the first character within the edit field 82. Step 514 is followed by decision step 516, in which it is determined whether data is received from the user input/output system 28. If no data is received in step 516, the "NO" branch is followed to step 520, in which the computer-implemented process illustrated by FIG. 5 is concluded. If data is received in step 516, the data is displayed in the edit field 82 in step 518. Step 518 is followed by step 520, in which the computer-implemented process illustrated by FIG. 5 is concluded. Following step 520, the computer-implemented process illustrated by FIG. 4 continues at step 408.

Figure 6:
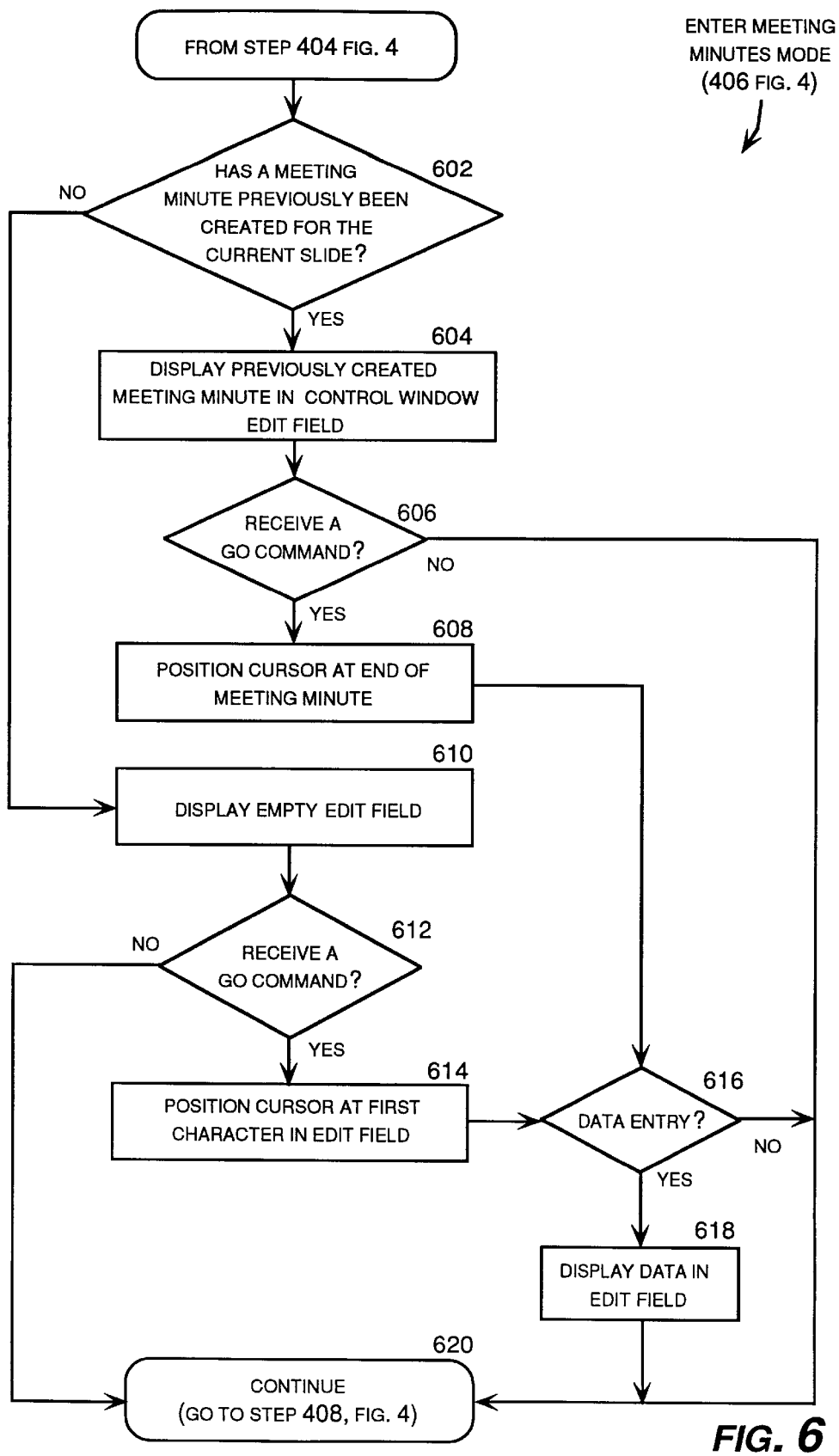
FIG. 6 is a logic flow diagram illustrating a computer-implemented process for a second control function associated with a control window for a presentation system.

FIG. 6 is a logic flow diagram illustrating a computer-implemented process for the control function associated with meeting minutes tab 86 of the meeting minder control window 80. The computer-implemented process illustrated by FIG. 6 corresponds to routine 406 shown in FIG. 4. FIG. 6 therefore begins following step 404, as the control window 80 is preferably initially activated in the meeting minutes mode. Alternatively, FIG. 6 may begin at the "YES" branch of step 412, which is followed in response to a determination that the command received in step 408 is a selection of the meeting minutes tab 86.

In step 602, it is determined whether any meeting minutes have been previously created for the current slide. It should be noted that meeting minutes may only be created or viewed through the operation of the control window 80. If meeting minutes have been previously created for the current slide, the "YES" branch is followed to step 604, in which the previously created meeting minutes are displayed in the edit field 82 of the control window 80. Step 604 is followed by decision step 606, in which it is determined whether the edit field 82 has been activated. The edit field 82 is activated when a "go" command is received from the user input/output system 28. A "go" command is preferably transmitted by placing the cursor within the edit field 82 and clicking the mouse 32 or pressing a selected key of the keyboard 30.

If a "go" command is not received in step 606, the "NO" branch is followed from decision step 606 to step 620, in which the computer-implemented process illustrated by FIG. 6 is concluded. Following step 620, the computer-implemented process illustrated by FIG. 4 continues at step 408. If a "go" command is received from the user input/output system 28, the "YES" branch is followed from step 606 to step 608. In step 608, a display item, typically a conventional text cursor, is placed at the end of the meeting minutes, which are displayed within the edit field 82 of the control window 80. Step 608 is followed by decision step 616, in which it is determined whether data is received from the user input/output system 28. If no data is received, the "NO" branch is followed from step 616 to step 620, in which the computer-implemented process illustrated by FIG. 6 is concluded.

If data is received in step 616, the "YES" branch is followed from step 616 to step 618, in which the edited data is displayed within the edit field 82 of the control window 80. Step 618 is followed by step 620, in which the computer-implemented process illustrated by FIG. 6 is concluded. Referring again to decision step 602, if no meeting minutes were previously created for the current slide, the "NO" branch is followed from step 602 to step 610, in which the control window 80 is displayed with the edit field 82 empty. In decision step 612, it is determined whether a "go" command is received from the user input/output system 28. Again, a "go" command is preferably transmitted by placing the cursor within the edit field 82 and clicking the mouse 32 or pressing a selected key of the keyboard 30. If a "go" command is not received, the "NO" branch is followed from step 612 to step 620, in which the computer-implemented process illustrated by FIG. 6 is concluded.

If a "go" command is received in step 612, a display item, typically a conventional text cursor, is placed at the first character within the edit field 82. Step 614 is followed by decision step 616, in which it is determined whether data is received from the user input/output system 28. If no data is received in step 616, the "NO" branch is followed to step 620, in which the computer-implemented process illustrated by FIG. 6 is concluded. If data is received in step 616, the data is displayed in the edit field 82 in step 618. Step 618 is followed by step 620, in which the computer-implemented process illustrated by FIG. 6 is concluded. Following step 620, the computer-implemented process illustrated by FIG. 4 continues at step 408.

Figure 7:
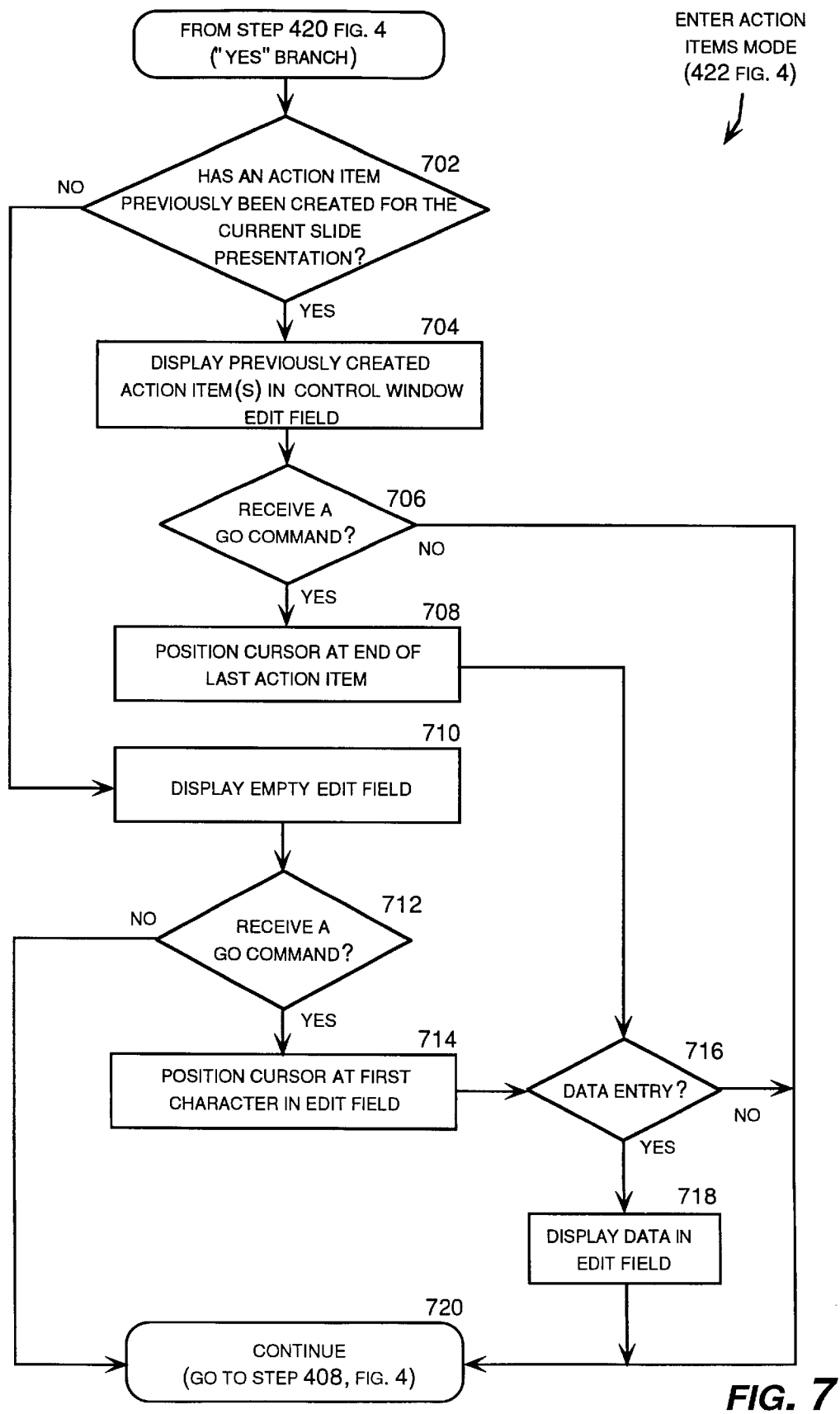
FIG. 7 is a logic flow diagram illustrating a computer-implemented process for a third control function associated with a control window for a presentation system.

FIG. 7 is a logic flow diagram illustrating a computer-implemented process for the control function associated with action items tab 88 of the meeting minder control window 80. The computer-implemented process illustrated by FIG. 7 corresponds to routine 422 shown in FIG. 4. FIG. 6 therefore begins at the "YES" branch of step 420, which is followed in response to a determination that the command received in step 408 is a selection of the action items tab 88.

In step 702, it is determined whether any action items have been reviously created for the current slide presentation (i.e., any action items associated with any of the slides of the current slide presentation). If action items have been previously created for the current slide presentation, the "YES" branch is followed to step 704, in which the previously created action items are displayed in the edit field 82 of the control window 80. Step 704 is followed by decision step 706, in which it is determined whether the edit field 82 has been activated. The edit field 82 is activated when a "go" command is received from the user input/output system 28. A "go" command is preferably transmitted by placing the cursor within the edit field 82 and clicking the mouse 32 or pressing a selected key of the keyboard 30.

If a "go" command is not received in step 706, the "NO" branch is followed from decision step 706 to step 720, in which the computer-implemented process illustrated by FIG. 7 is concluded. Following step 720, the computer-implemented process illustrated by FIG. 4 continues at step 408. If a "go" command is received from the user input/output system 28, the "YES" branch is followed from step 706 to step 708. In step 708, a display item, typically a conventional text cursor, is placed at the end of the action items, which are displayed within the edit field 82 of the control window 80. Step 708 is followed by decision step 716, in which it is determined whether data is received from the user input/output system 28. If no data is received, the "NO" branch is followed from step 716 to step 720, in which the computer-implemented process illustrated by FIG. 7 is concluded.

If data is received in step 716, the "YES" branch is followed from step 716 to step 718, in which the edited data is displayed within the edit field 82 of the control window 80. Step 718 is followed by step 720, in which the computer-implemented process illustrated by FIG. 7 is concluded. Referring again to decision step 702, if no action items were previously created for the current slide presentation, the "NO" branch is followed from step 702 to step 710, in which the control window 80 is displayed with the edit field 82 empty. In decision step 712, it is determined whether a "go" command is received from the user input/output system 28. Again, a "go" command is preferably transmitted by placing the cursor within the edit field 82 and clicking the mouse 32 or pressing a selected key of the keyboard 30. If a "go" command is not received, the "NO" branch is followed from step 712 to step 720, in which the computer-implemented process illustrated by FIG. 7 is concluded.

If a "go" command is received in step 712, a display item, typically a conventional text cursor, is placed at the first character within the edit field 82. Step 714 is followed by decision step 716, in which it is determined whether data is received from the user input/output system 28. If no data is received in step 716, the "NO" branch is followed to step 720, in which the computer-implemented process illustrated by FIG. 7 is concluded. If data is received in step 716, the data is displayed in the edit field 82 in step 718. Step 718 is followed by step 720, in which the computer-implemented process illustrated by FIG. 7 is concluded. Following step 720, the computer-implemented process illustrated by FIG. 4 continues at step 408.

It should be appreciated that the computer-implemented process illustrated by the logic flow diagrams of FIGS. 6 and 7 are nearly identical to the computer-implemented process illustrated by the logic flow diagram of FIG. 5. The only difference between the computer-implemented process illustrated by FIG. 6 and the computer-implemented process illustrated by FIG. 5, is that the previously created meeting minutes associated with the current slide (steps 602–604), rather than the previously created speaker's notes associated with the current slide (steps 502–504), may be displayed within the edit field 82 of the control window 80. Similarly, the only difference between the computer-implemented process illustrated by FIG. 7 and the computer-implemented process illustrated by FIG. 5, is that all previously created action items associated with the current slide presentation (steps 702–704), rather than the previously created speaker's notes associated with the current slide (steps 502–504), are displayed within the edit field 82 of the control window 80. It will therefore be appreciated that the meeting minder control window 80 offers the advantage of allowing the user to display, edit, and delete speaker's notes, meeting minutes, and action items in virtually the same manner.

Figure 8:
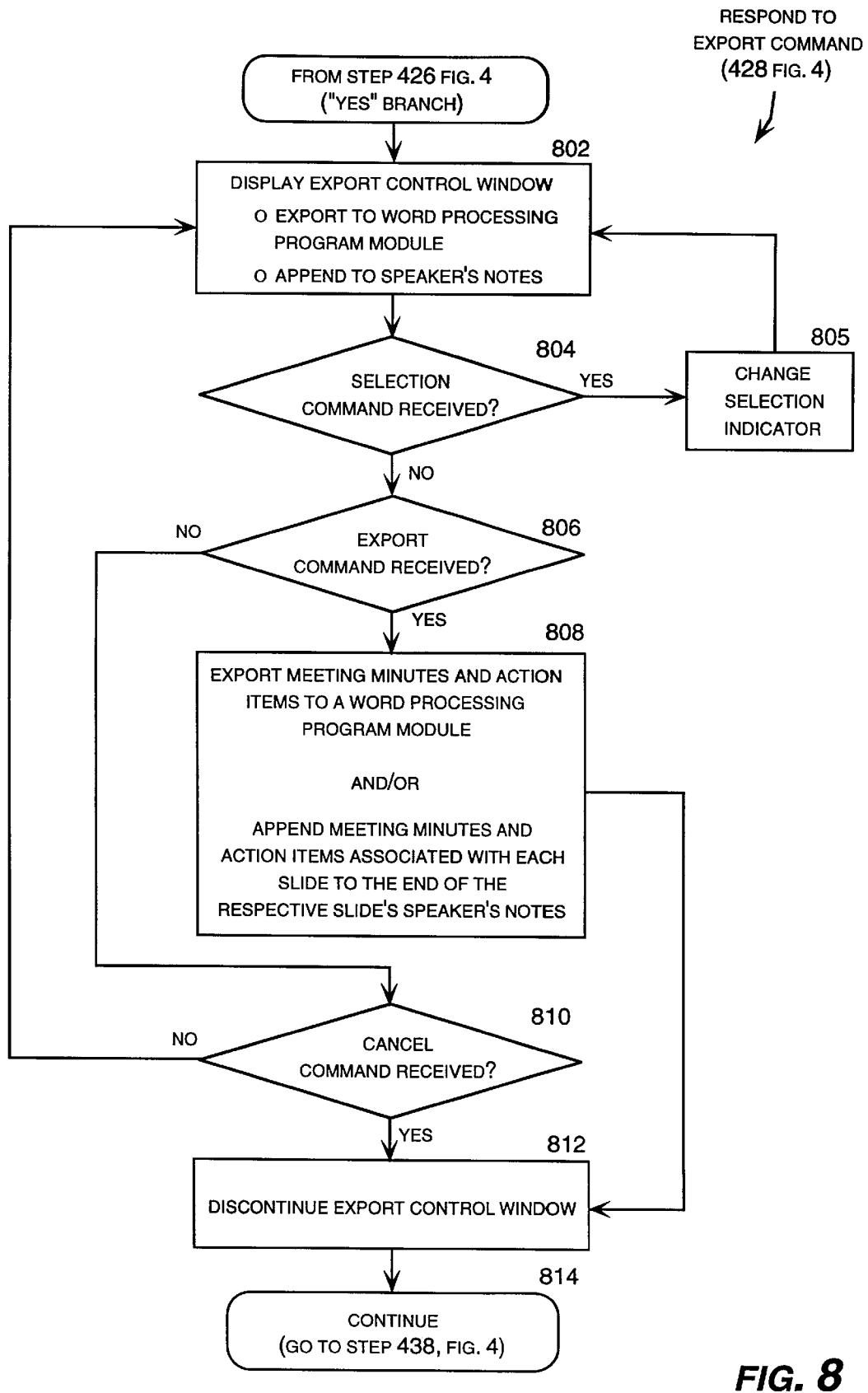
FIG. 8 is a logic flow diagram illustrating a computer-implemented process for a fourth control function associated with a control window for a presentation system.

FIG. 8 is a logic flow diagram illustrating a computer-implemented process for a control function associated with the export button 94 of the control window 80. The computer-implemented process illustrated by FIG. 8 corresponds to routine 428 shown on FIG. 4. The computer-implemented process illustrated by FIG. 8 therefore begins at the "YES" branch of step 426, which is followed in response to a determination that command received in step 408 was a selection of the export button 94.

In step 802, an export control window is displayed on the monitor 36. The export control window allows the user to select either or both of the following functions: export to the word processing program module 50, and/or append meeting minutes to speaker's notes. In step decision 804, it is determined whether a selection command is received. If a selection command is received, the "YES" branch is followed from step 804 to step 805, in which the selection indicator of the export control window is changed. Following step 805, the computer-implemented process illustrated by FIG. 8 loops to step 802, in which the export control window is displayed.

If a selection command is not received, the "NO" branch is followed from step 804 to decision step 806, in which it is determined whether an export command is received. If an export command is received, the "YES" branch is followed from step 806 to step 808. In step 808, the meeting minutes and the action items are exported to the word processing program module 50 if the "export to word processing program module" option is selected in the export control window. In addition, the meeting minutes may be appended to the end of the speaker's notes if the "append to speaker's notes" option is selected in the export control window. If this option is selected, the meeting minutes associated with each slide are appended to the speaker's notes associated with the respective slide. Step 808 is followed by step 812, in which the export control window is discontinued. Step 812 is followed by step 814, in which the computer-implemented process illustrated by FIG. 8 is concluded.

If an export command is not received, the "NO" branch is followed from step 806 to decision step 810, in which it is determined whether a cancel command is received. If a cancel command is received, the "YES" branch is followed from step 810 to step 814, in which the computer-implemented process illustrated by FIG. 8 is concluded and the computer-implemented process illustrated by FIG. 4 continues at step 438. If a cancel command is not received, the user has not transmitted a valid command and the computer-implemented process illustrated by FIG. 8 therefore loops to step 802, in which the export window remains displayed on the monitor 36.

Figure 9:
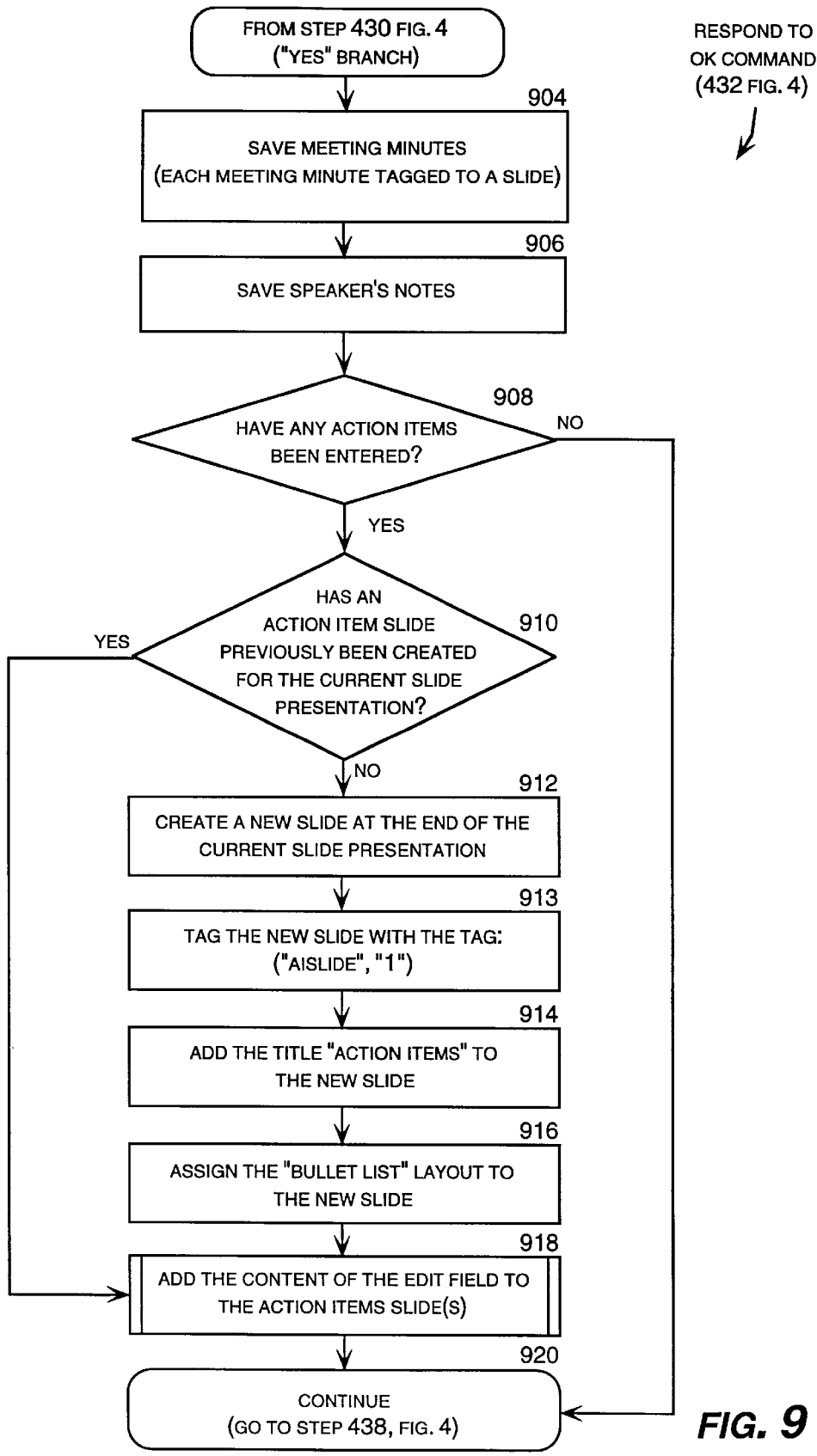
FIG. 9 is a logic flow diagram illustrating a computer-implemented process for a fifth control function associated with a control window for a presentation system.

FIG. 9 is a logic flow diagram illustrating a computer-implemented process for a control function associated with the OK button 90 of the control window 80. The computer-implemented process illustrated by FIG. 9 corresponds to routine 432 shown on FIG. 4. The computer-implemented process illustrated by FIG. 9 therefore begins at the "YES" branch from step 430, in which it was determined that the command received from the user input/output system 28 in step 408 was the selection of the OK button.

In step 904, each meeting minute is tagged to the slide that was current when the meeting minute was created. Tagging a meeting minute to a slide causes an array containing a name-value pair to be embedded within the slide. The name is set to "meeting minutes" and the value is set to the data string comprising the text of the meeting minute. The memory address locations in which the meeting minute is stored are thereby linked to the memory address locations in which the slide is stored.

Step 904 is followed by step 906, in which the speaker's notes are saved. These speaker's notes are the same speaker's notes that may be created and saved through the operation of the edit-mode control window 74 when the presentation program module 52 is in the notes-view mode.

Saving speaker's notes created or edited through the operation of the control window 80 augments or replaces the speaker's notes created and saved through the operation of the edit-mode control window 74 when the presentation program module 52 is in the notes-view mode.

Step 906 is followed by decision step 908, in which is it determined whether any action items have been entered. If no action items have been entered, the "NO" branch is followed to step 920, in which the computer-implemented process illustrated by FIG. 9 is concluded, and the computer-implemented process illustrated by FIG. 4 continues at step 438. If action items have been entered, the "YES" is followed from step 908 to decision step 910, in which is it determined whether any action items have been previously created for the current slide presentation.

If no action items have been previously created for the current slide presentation, the "NO" branch is followed from step 910 to step 912, in which a new slide is created at the end of the current slide presentation. Step 912 is followed by step 913, in which the new slide is tagged with a tag "AIslide" which is given a value of "1." Step 913 is followed by step 914, in which the title "Action Items" is added to the new slide. In step 916, the "bullet-list" layout is assigned to the new slide, and in routine 918, the content of the edit field 82 is added to the action items slide. Referring again to step 910, if an action items slide has been previously created for the current slide presentation, the "YES" branch is followed from step 910 to routine 918. Routine 918 is followed by step 920, in which the computer-implemented process illustrated by FIG. 9 is concluded, and the computer-implemented process illustrated by FIG. 4 continues at step 438.

Figure 10:
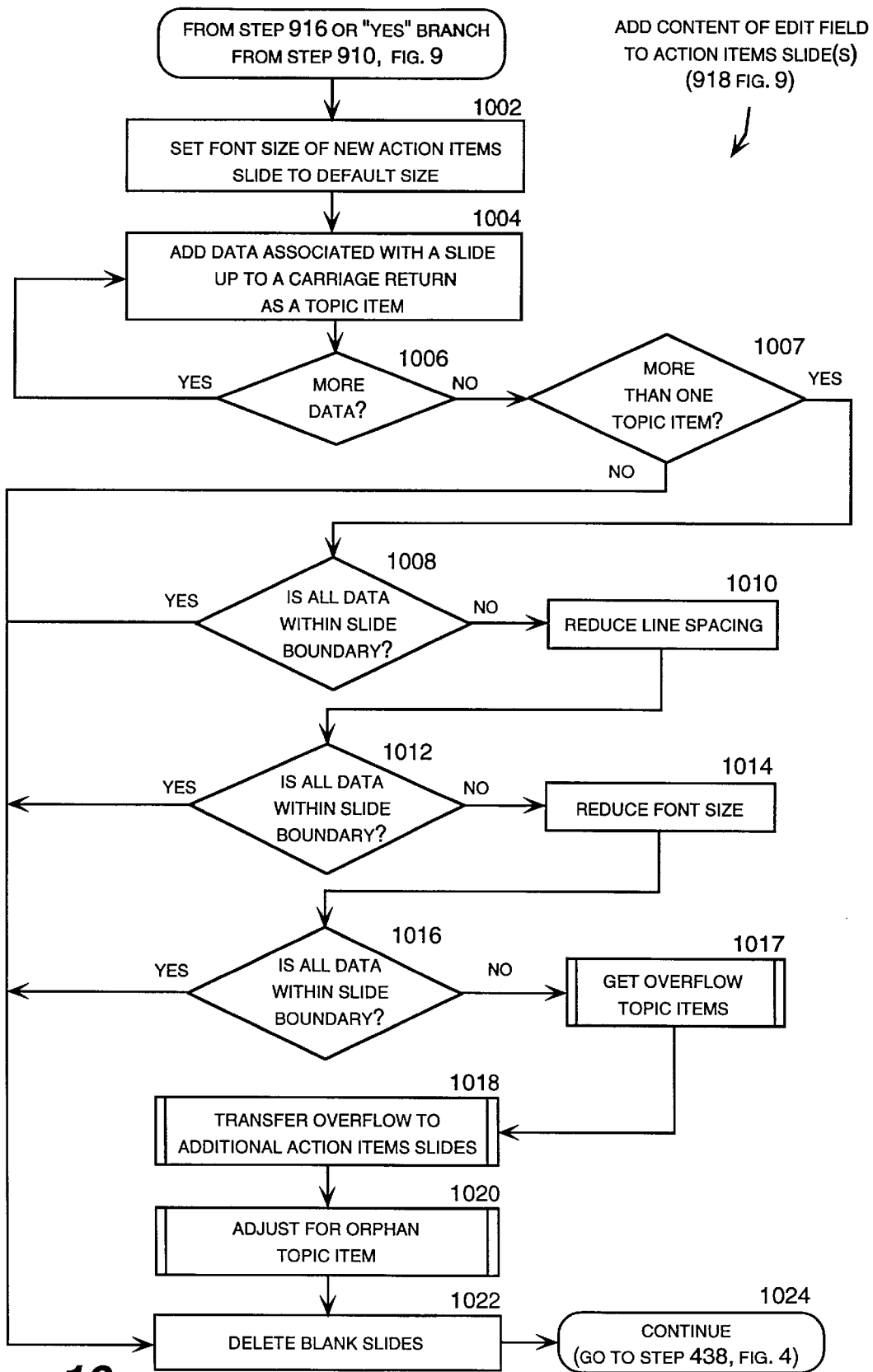
FIG. 10 is a logic flow diagram illustrating a computer-implemented process for displaying topic items on slides appended to the end of a slide presentation.

FIG. 10 is a logic flow diagram illustrating a computer-implemented process for displaying topic items on slides appended to the end of a slide presentation. The computer-implemented process illustrated by FIG. 10 corresponds to routine 918 shown on FIG. 9. The computer-implemented process illustrated by FIG. 10 therefore begins after step 916 shown on FIG. 9.

In step 1002, the font size of the new action items slide is set to a default size, typically 32 points. Step 1002 is followed by step 1004, in which the action item data associated with the slide presentation up to a carriage return, or all the action item data associated with the slide presentation if there is no carriage return, is added to the action items slide as a topic item. Step 1004 is followed by decision step 1006, in which it is determined whether there is more action item data. If there is more data, the "YES" branch is followed back to step 1004, and the additional data associated with a slide up to a carriage return is added to the action items slide as a topic item. The computer-implemented process illustrated by FIG. 10 loops through the steps 1004 through 1006 until all of the action item data has been assigned, as a plurality of topic items, to the action items slide.

Referring again to decision step 1006, if there is no more action item data, the "NO" branch is followed from step 1006 to decision step 1007, in which it is determined whether there is more than one topic item. If there is only one topic item, the "NO" branch is followed from step 1007 to step 1022, in which blank slides, if any, are deleted. Action item slides are identified by checking each slide for the existence of a tag "AIslide" with a value of "1." It should be understood that the computer-implemented process illustrated by FIG. 10 preferably checks for blank slides, as blank slides may arise when the user adds and then deletes a number of action items. Step 1022 is followed by step 1024, in which the computer-implemented process illustrated by FIG. 10 is concluded.

Referring again to step 1007, if there is more than one topic item, the "YES" branch is followed from step 1107 to decision step 1008, in which it is determined whether all of the data assigned to the action items slide fits within the boundary of the slide. If the data fits, the "YES" branch is followed from step 1108 to step 1022, in which blank slides are deleted, as described above. If the data does not fit within the boundary of the action items slide, the "NO" branch is followed from step 1108 to step 1010 in which the line spacing of the action items slide is reduced, preferably by ten percent. Step 1010 is followed by decision step 1012, in which it is again determined whether the data fits within the boundary of the action items slide. If the data fits, the "YES" branch is followed to step 1022, in which any blank action item slides are deleted. Step 1022 is followed by step 1024, in which the computer-implemented process illustrated by FIG. 10 is concluded.

Referring again to decision step 1012, if the data still does not fit within the boundary of the action items slide, the "NO" branch is followed to step 1014 in which the font size of the action items slide is reduced, preferably by four points. Step 1014 is followed by decision step 1016, in which it is again determined whether the data fits within the boundary of the action items slide. If the data fits, the "YES" branch is followed to step 1022, in which any blank action item slides are deleted, as described above.

Referring again to decision step 1016, if the data still does not fit within the boundary of the action items slide, the "NO" branch is followed to routine 1017 in which overflow action items are identified. The operation of routine 1017 is described with more particularity with respect to FIG. 11 below. Routine 1017 is followed by routine 1018 in which the overflow action items are transferred to additional action items slides. The operation of routine 1018 is described with more particularity with respect to FIG. 12 below. Routine 1018 is followed routine 1020, in which the action item slides may be adjusted in response to a single topic item, known as an orphan topic item, appearing on the last action items slide. Routine 1020 is described with more particularity with respect to FIG. 12 below.

Routine 1020 is followed by step 1022, in which any blank action item slides are deleted. Step 1022 is followed by step 1024, in which the computer-implemented process illustrated by FIG. 10 is concluded. Following step 1024, the computer-implemented process illustrated by FIG. 4 continues at step 438.

Figure 11:
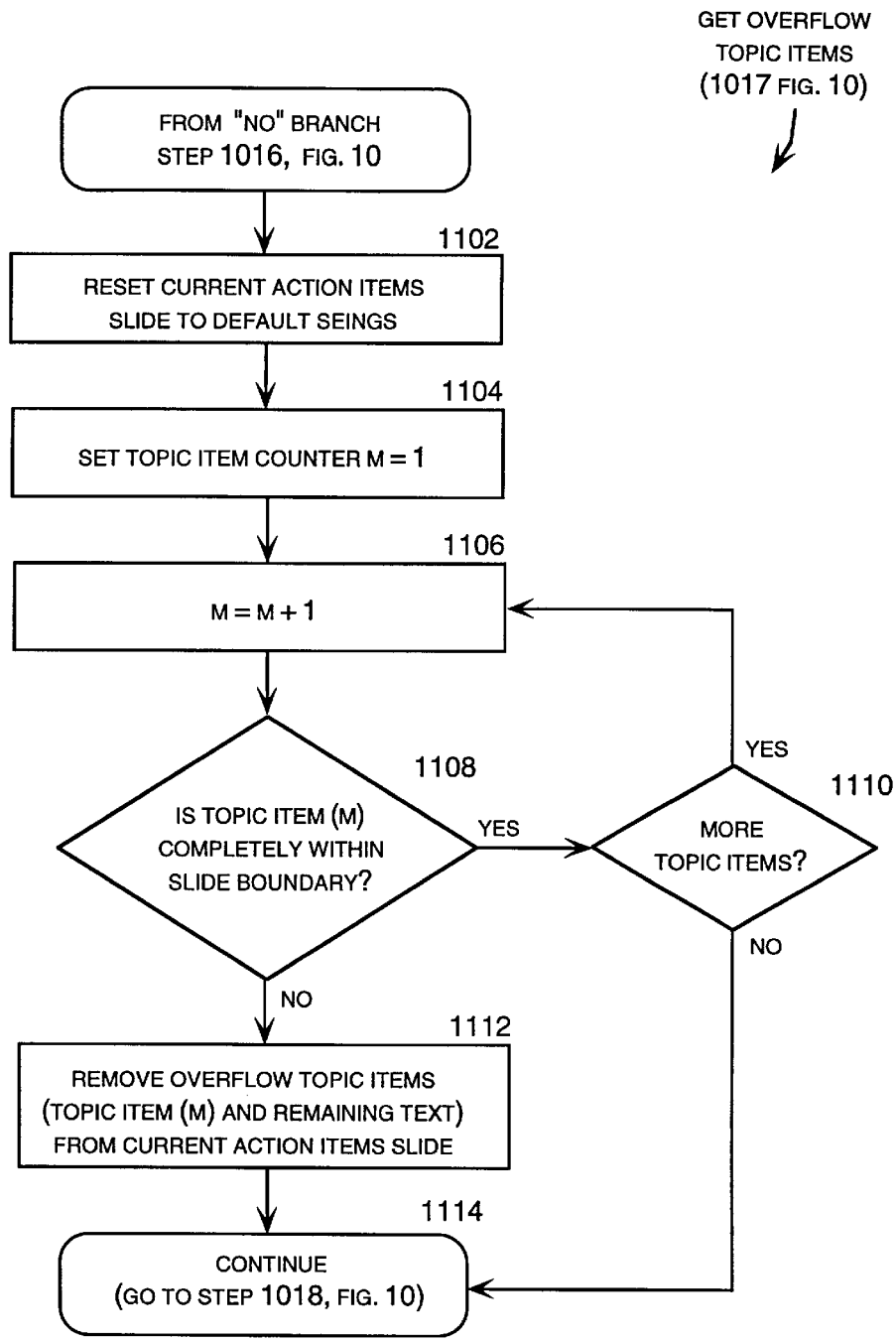
FIG. 11 is a logic flow diagram illustrating a computer-implemented process for identifying overflow topic items.

FIG. 11 is a logic flow diagram illustrating a computer-implemented process for identifying overflow topic items. The computer-implemented process illustrated by FIG. 11 corresponds to routine 1017 shown on FIG. 10. The computer-implemented process illustrated by FIG. 11 therefore begins at the "NO" branch of step 1016, in which it was determined that the data assigned to the current action items slide does not fit within the boundary of the slide.

In step 1102, the current action items slide is reset to its default settings, preferably including a default font setting of 32 points. Step 1102 is followed by step 1104, in which a topic items counter "M" is set equal to one. Step 1104 is followed by step 1106, in which the topic items counter "M" is incremented by one. Step 1106 is followed by decision step 1108, in which it is determined whether the topic item(M) fits within the boundary of the current action items slide.

If the topic item(M) fits within the boundary of the current action items slide, the "YES" branch is followed from step 1108 to step 1110, in which it is determined whether there are more topic items. If there are no more topic items, the "NO" branch is followed from step 1110 to step 1114, in which the computer-implemented process illustrated by FIG. 10 continues at step 1018, and the computer-implemented process illustrated by FIG. I1 is completed. If there are more topic items, the "YES" branch is followed from step 1110 back to step 1106, in which the topic items counter "M" is incremented by one. The computer-implemented process illustrated by FIG. 11 thus loops through steps 1106 through 1110 until a topic item cannot fit within the boundary of the current slide, or until the last topic item fits within the boundary of the current slide.

Referring again to decision step 1108, if the topic item(M) does not within the boundary of the current action items slide, the "NO" branch is followed from step 1108 to step 1112, in which the overflow topic items including the topic item(M) and the remaining action items are removed from the current action items slide. Step 1112 is followed by step 1114, in which the computer-implemented process illustrated by FIG. 10 continues at routine 1018, and the computer-implemented process illustrated by FIG. 11 is completed. Routine 1018 shown on FIG. 10 is described in detail with respect to FIG. 12 below.

Figure 12:
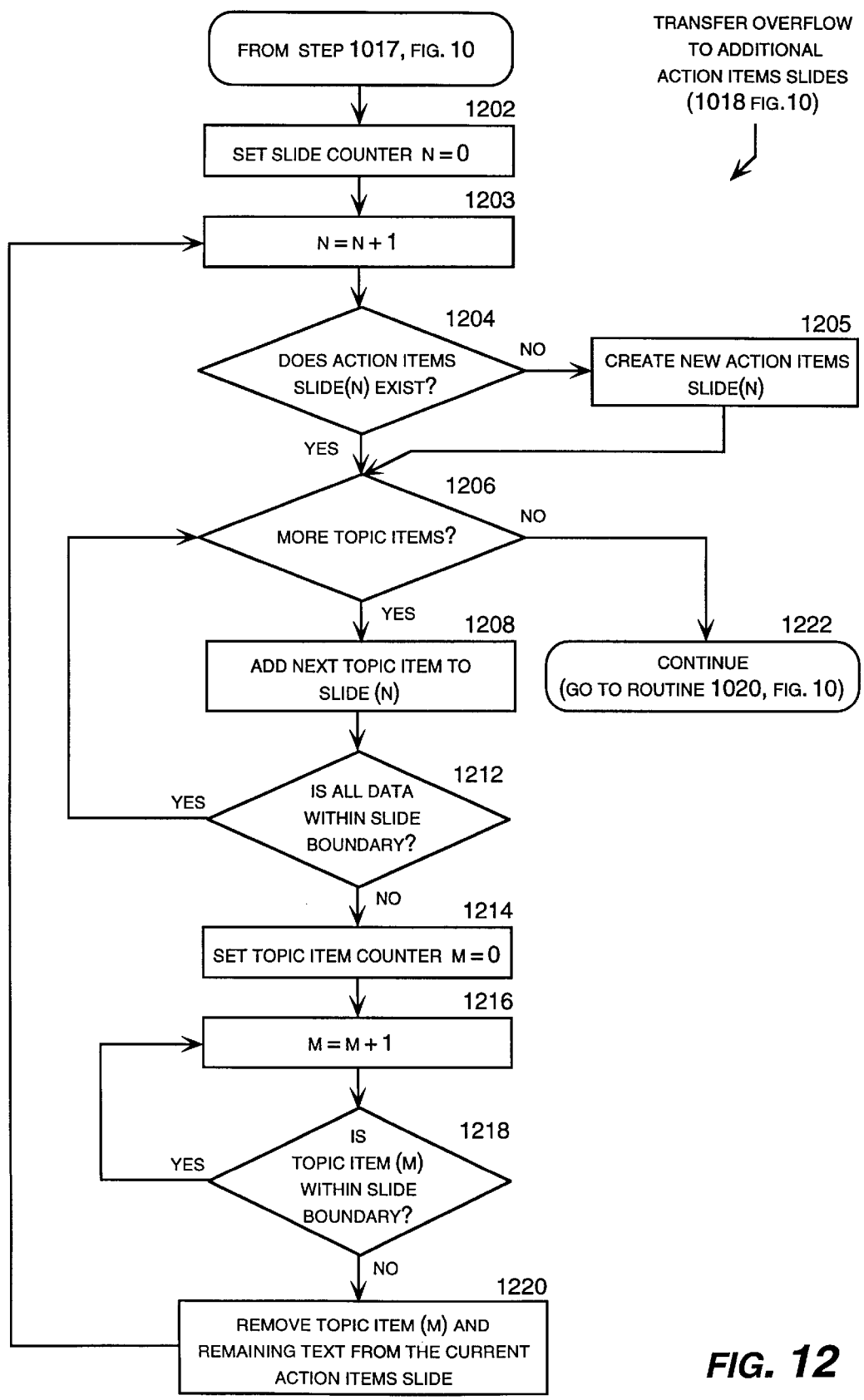
FIG. 12 is a logic flow diagram illustrating a computer-implemented process for transferring overflow topic items to additional slides appended to the end of a slide presentation.

FIG. 12 is a logic flow diagram illustrating a computer-implemented process for transferring overflow topic items to additional slides appended to the end of a slide presentation. The computer-implemented process illustrated by FIG. 12 corresponds to routine 1018 shown on FIG. 10. The computer-implemented process illustrated by FIG. 12 therefore begins after routine 1016 shown on FIG. 10.

In step 1202, an action items slide counter "N" is initialized by setting "N" to zero. Step 1202 is followed by step 1203, in which the action items slide counter "N" is incremented by one. Step 1203 is followed by decision step 1204, in which it is determined whether an action items slide(N) exists. If an action items slide(N) does not exist, the "NO" branch is followed from step 1204 to step 1205, in which a new action items slide(N) is created. Step 1205, and the "YES" branch from step 1204, are followed by decision step 1206 in which it is determined whether there are more topic items. If there are no more topic items, the "NO" branch is followed from decision step 1206 to step 1222, in which the computer-implemented process illustrated by FIG. 10 continues at step 1020, and the computer-implemented process illustrated by FIG. 12 is concluded.

Referring again to step 1206, if there are more topic items, the "YES" branch is followed from step 1206 to step 1208, in which the next topic item is added to slide(N). Step 1208 is followed by decision step 1212, in which it is determined whether all of the data assigned to slide(N) fits within the boundary of the slide. If the data fits, the "YES" branch is followed back to step 1206, in which it is determined whether there are more topic items. The computer implemented process illustrated by FIG. 11 loops through steps 1206 through 1212 until all of the topic items have been assigned to slide(N) (i.e., the "NO" branch of decision step 1206), or until all of the data assigned to slide(N) does not fit within the boundary of the slide (i.e., the "NO" branch of decision step 1212).

Referring again to decision step 1212, if all of the data assigned to slide(N) does not fit within the boundary of the slide, the "NO" branch is followed from step 1212 to step 1214, in which the topic items counter "M" is set to zero. Step 1214 is followed by step 1216, in which the topic items counter "M" is incremented by one. Step 1218 is followed by decision step 1218, in which it is determined whether the topic item(M) is within the boundary of the current slide. If the topic item(M) fits within the boundary of the current slide, the "YES" branch loops from step 1218 to step 1216, in which the topic items counter "M" is incremented by one. If the topic item(M) does not fit within the boundary of the current slide, the "NO" branch is followed from step 1218 to step 1220, in which the topic item(M) and the remaining topic items are removed from the current slide.

After step 1220, the computer-implemented process illustrated by FIG. 12 loops to step 1203, in which the action items slide counter "N" is incremented by one. It should therefore be appreciated that the computer-implemented process illustrated by FIG. 12 loops through steps 1203 through 1220 until all of the topic items have been assigned to, and fit within the boundary of, an action items slide.

Figure 13:
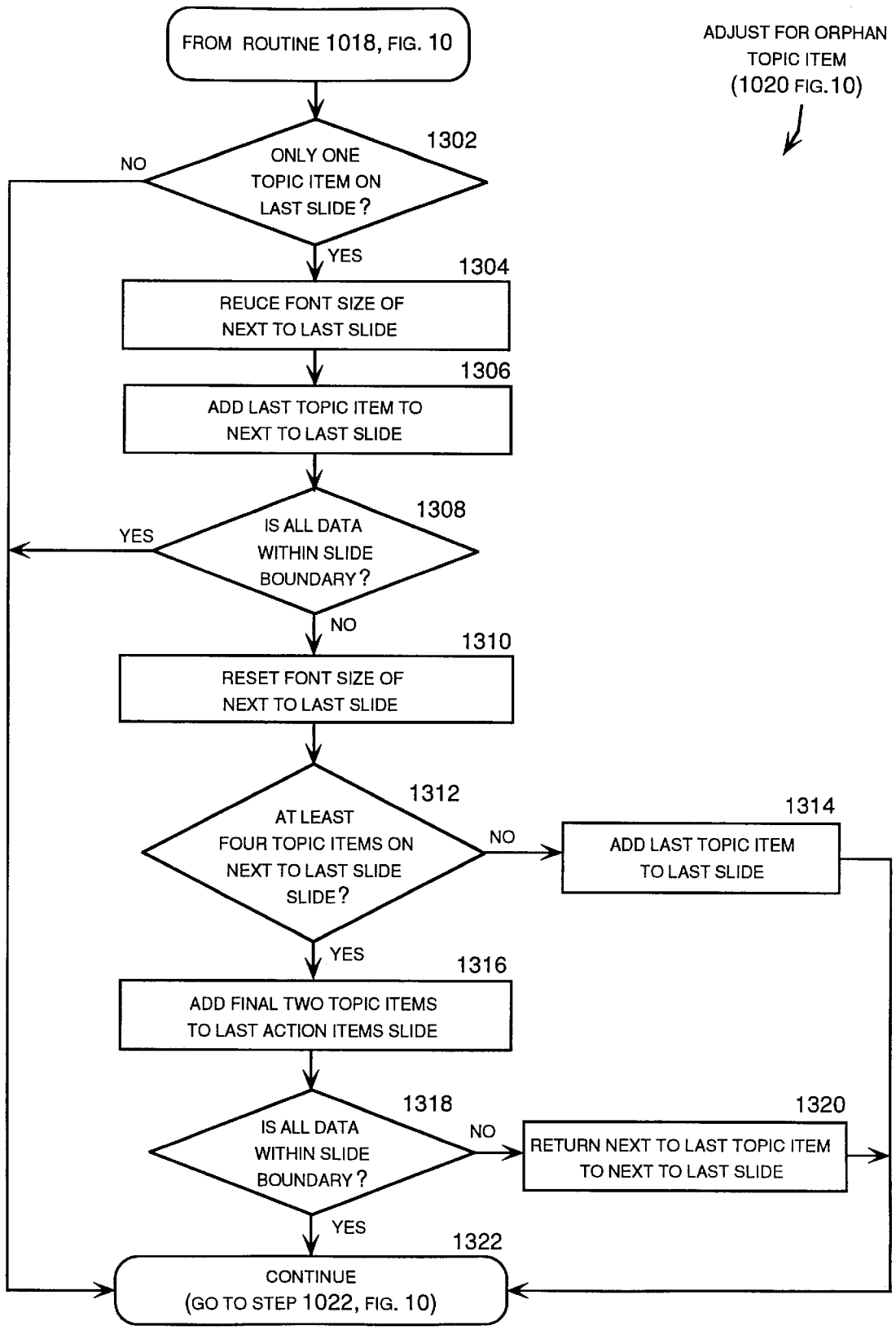
FIG. 13 is a logic flow diagram illustrating a computer-implemented process for adjusting slides displaying topic items in response to the occurrence of an orphan topic item.

FIG. 13 is a logic flow diagram illustrating a computer-implemented process for adjusting slides displaying topic items in response to the occurrence of an orphan topic item. The computer-implemented process illustrated by FIG. 13 corresponds to routine 1020 shown on FIG. 10. The computer-implemented process illustrated by FIG. 13 therefore begins at the conclusion of routine 1018.

In decision step 1302, it is determined whether an orphan topic item appears on the last action items slide. If an orphan topic item does not appear on the last action items slide, the "NO" branch is followed to step 1322, in which the computer-implemented process illustrated by FIG. 13 is concluded. If an orphan topic item does appear on the last action items slide, the "YES" branch is followed from decision step 1302 to step 1304, in which the font size of the previous action items slide is reduced, preferably by four points. Step 1304 is followed by step 1306, in which the last topic item is added to the next-to-last action items slide. Step 1306 is followed by decision step 1308, in which it is determined whether all of the text fits within the boundary of the next-to-last action items slide. If the text fits within the boundary of the next-to-last action items slide, the "YES" branch is followed to step 1322, in which the computer-implemented process illustrated by FIG. 13 is concluded.

If all of the text does not fit within the boundary of the previous action items slide, the "NO" branch is followed from decision step 1308 to step 1310, in which the font size of the next-to-last action items slide is reset, preferably by increasing the font size by four points. Step 1310 is followed by decision step 1312, in which it is determined whether the next-to-last action items slide includes at least four topic items. If the next-to-last action items slide does not include at least four topic items, the "NO" branch is followed from step 1312 to step 1314, in which only the last topic item is moved to the last action items slide.

Referring again to decision step 1312, if the next-to-last action items slide includes at least four topic items, the "YES" branch is followed from step 1312 to step 1316, in which the last two topic items are moved to the last action items slide. Step 1316 is followed by decision step 1318, in which it is determined whether all of the data assigned to the last action items slide fits within the boundary of the slide. If the data assigned to the last slide does not fit, the line spacing and font size of the last slide may optionally be reduced. If the data still does not fit, the "NO" branch is followed from step 1318 to step 1320 in which the next-to-last topic item is returned to the next-to-last action items slide. Step 1320 is followed by step 1322, in which the computer-implemented process illustrated by FIG. 12 is concluded.

Referring again to decision step 1318, if the data does fit within the boundary of the last action items slide, the "YES"

branch is followed from step 1318 to step 1320, in which the computer-implemented process illustrated by FIG. 13 is concluded. Thus, the last two topic items remain on the last action items slide, and an orphan topic item is avoided. Following step 1322, the computer-implemented process illustrated by FIG. 10 continues at step 1022.

In view of the foregoing, it will be appreciated that the present invention provides an improved method and system for interacting with the content of a slide presentation during the course of the presentation. More specifically, the present invention provides a presentation system including a control window, that may be invoked when the presentation system is in a slide-show mode, and that provides an easy-to-use interface including selectable control functions that are specifically designed to allow a user to effectively interact with the content of a slide presentation during the course of the presentation.

It should be understood that the foregoing relates only to the preferred embodiments of the present invention, and that numerous changes may be made therein without departing from the spirit and scope of the invention as defined by the following claims.

What is claimed is:

1. In a computer system comprising a processing unit, a memory storage device, a user input/output system including a monitor, and a presentation program module including instructions which, when executed by the processing unit, cause the computer system to display a plurality of slides on the monitor, a method for interacting with the content of the slides comprising the steps of:

retrieving a slide from the memory storage device;

displaying the slide on the monitor;

while displaying the slide on the monitor, displaying a control window on the monitor on top of a portion of the slide, the control window comprising an edit field and a plurality of control items for invoking control functions associated with the presentation program module;

obtaining information that is unrelated to defining the appearance the underlying slide from addressed locations in the memory storage device that are linked to addressed locations in which the slide is stored; and displaying the information within the edit field of the control window.

2. The method of claim 1, wherein the information comprises a previously created note, associated with the slide, retrieved from the memory storage device.

3. The method of claim 2, further comprising the steps of:

receiving a command from the user input/output system altering the note;

displaying the altered note in the control window; and storing the altered note in the memory storage device in addressed locations in the memory storage device that are linked to addressed locations in which the slide is stored.

4. The method of claim 3, further comprising the step of exporting the altered note to a word processing program module that resides within the memory storage device.

5. The method of claim 1 wherein the control window includes:

a first control item associated with a first control function of the presentation program module for causing a previously created note, associated with the first slide and unrelated to defining the appearance the first slide, to be retrieved from the memory storage device and displayed in the control window;

a second control item associated with a second control function of the presentation program module for causing a second note, associated with the slide and unrelated to defining the appearance the first slide, to be created from data received from the user input/output system while the control window is displayed on the monitor; and a third control item associated with a third control function of the presentation program module for causing a second slide to be created from data received from the user input/output system while the control window is displayed on the monitor and without altering the appearance the first slide.

6. A computer-readable medium storing a presentation program module comprising instructions which, when executed by a computer system comprising a processing unit, a memory storage device, and a user input/output system including a monitor, cause the computer system to perform the steps of;

retrieving a slide from the memory storage device;

displaying the slide on the monitor;

while displaying the slide on the monitor, displaying a control window on the monitor on top of a portion of the slide;

in response to data from the user input/output system, creating a note, associated with the underlying slide and unrelated to defining the appearance the underlying slide, while the control window is displayed on the monitor;

displaying the note in the control window; and embedding the note within object defining the slide by storing the note in the memory storage device in addressed locations that are linked to the addressed locations in which the slide is stored.

7. A computer-readable medium storing a presentation program module comprising instructions which, when executed by a computer system comprising a processing unit, a memory storage device, and a user input/output system including a monitor, cause the computer system to perform the steps of:

receiving data from the user input/output system;

formatting data received from the user input/output system as a plurality of topic items to be displayed on a first slide-having a boundary;

determining whether the topic items can be displayed within the boundary of the first slide; and if the topic items do not fit within the boundary of the slide, automatically creatin a second slide; and displaying the topic items partially in the first slide and partially in the second slide.

8. The computer-readable medium of claim 7, wherein the instructions of the presentation program module, when executed by the processing unit, further cause the computer system to perform the steps of:

determining whether the second slide contains only a single orphan topic item;

if the second slide contains an orphan topic item;

reducing a font size associated with the topic items displayed on the first slide; and displaying the orphan topic item in the first slide at the reduced font size.

9. The computer-readable medium of claim 8, wherein the instructions of the presentation program module, when executed by the processing unit, further cause the computer system to perform the steps of:

determining whether the orphan topic item at the reduced font size fits within the boundary of the first slide; and if the orphan topic item at the reduced font size does not fit within the boundary of the fit slide;

resetting the font size associated with the topic items displayed on the first slide;

diplaying the orphan topic item in the second slide; and moving a second topic item from the first slide to the second slide.

10. A presentation system comprising:

a computer system including a processing unit, a memory storage device, and a user input/output system including a monitor; and a presentation program module including instructions which, when executed by the processing unit, cause the computer system to perform the steps of, displaying a first slide on the monitor;

while displaying the first slide on the monitor, displaying a control window on the monitor on top of a portion of the slide, the control window comprising, a first control item associated with a first control function of the presentation program module for causing a previously created note, associated with the first slide and unrelated to defining the appearance the first slide, to be retrieved from addressed locations in the memory storage device that are linked to addressed locations in which the slide is stored and displayed in the control window; and a second control item associated with a second control function of the presentation program module causing a second slide to be created from data unrelated to defining the appearance the first slide and received from the user input/output system while the control window is displayed on the monitor.

11. The presentation system of claim 10, wherein the control window further comprises:

a third control item associated with a third control function of the presentation program module for causing a second note, associated with the slide, to be created from data received from the user input/output system while the control window is displayed on the monitor; and a fourth control item associated with a fourth control function of the presentation program module for causing data received from the user input/output system to be exported to a second program module that resides within the memory storage device.

12. The presentation system of claim 11, wherein the second program module comprises a word processing program module.

13. In a computer system comprising a processing unit, a memory storage device, a user input/output system including a monitor, and a presentation program module including instructions which, when executed by the processing unit, cause the computer system to display a plurality of slides on the monitor, a method for interacting with the content of the slides comprising the steps of:

retrieving a first slide from the memory storage device;

displaying the first slide on the monitor; and displaying a control window on the monitors on top a portion of the first slide, wherein the control window comprises, an edit field for displaying, creating, and editing information including data retrieved from the memory storage device and data received from the user input/output system while the control window is displayed on the monitor;

a first control item associated with a first control function of the presentation program module for causing a previously created note, associated with the slide and unrelated to defining the appearance the slide, to be retrieved from addressed locations in the memory storage device that are linked to addressed locations in which the slide is stored and displayed in the control window;

a second control item associated with a second control function of the presentation program module for causing a second note, associated with the slide and unrelated to defining the appearance the slide, to be created from data received from the user input/output system while the control window is displayed on the monitor;

a third control item associated with a third control function of the presentation program module for causing a second slide to be created from data received from the user input/output system while the control window is displayed on the monitor;

a fourth control item associated with a fourth control function of the presentation program module for causing data received from the user input/output system to be exported to a word processing program module that resides within the memory storage device;

a fifth control item associated with a fifth control function of the presentation program module for storing information displayed within the control window in the memory storage device; and a sixth control item associated with a sixth control function of the presentation program module for discontinuing the display of the control window without storing information displayed within the control window in the memory storage device.

* * * * *